US010417236B2

(12) United States Patent
Noyes

(10) Patent No.: US 10,417,236 B2
(45) Date of Patent: *Sep. 17, 2019

(54) DEVICES, SYSTEMS, AND METHODS TO SYNCHRONIZE SIMULTANEOUS DMA PARALLEL PROCESSING OF A SINGLE DATA STREAM BY MULTIPLE DEVICES

(71) Applicant: Micron Technology, Inc., Boise, ID (US)

(72) Inventor: Harold B Noyes, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/204,677

(22) Filed: Nov. 29, 2018

(65) Prior Publication Data

US 2019/0095496 A1 Mar. 28, 2019

Related U.S. Application Data

(63) Continuation of application No. 15/208,419, filed on Jul. 12, 2016, now Pat. No. 10,162,862, which is a continuation of application No. 12/325,986, filed on Dec. 1, 2008, now abandoned.

(51) Int. Cl.
*G06F 13/28* (2006.01)
*G06F 16/2455* (2019.01)
*G06F 13/42* (2006.01)

(52) U.S. Cl.
CPC ........ *G06F 16/24568* (2019.01); *G06F 13/28* (2013.01); *G06F 13/4282* (2013.01)

(58) Field of Classification Search
CPC . G06F 16/24568; G06F 13/4282; G06F 13/28
See application file for complete search history.

(56) References Cited

U.S. PATENT DOCUMENTS

| 3,849,762 | A | 11/1974 | Fujimoto et al. |
| 3,921,136 | A | 11/1975 | Bar-Lev |
| 4,011,547 | A | 3/1977 | Kimmel |
| 4,014,000 | A | 3/1977 | Uno et al. |
| 4,123,695 | A | 10/1978 | Hale et al. |

(Continued)

FOREIGN PATENT DOCUMENTS

| EP | 0476159 A1 | 3/1992 |
| EP | 0943995 | 9/1999 |

(Continued)

OTHER PUBLICATIONS

PCT/US2009/06754 International Search Report and Written Opinion dated Apr. 26, 2010.

(Continued)

*Primary Examiner* — Jing-Yih Shyu
(74) *Attorney, Agent, or Firm* — Fletcher Yoder, P.C.

(57) ABSTRACT

Disclosed are methods and devices, among which is a system that includes a device that includes one or more pattern-recognition processors in a pattern-recognition cluster, for example. One of the one or more pattern-recognition processors may be initialized to perform as a direct memory access master device able to control the remaining pattern-recognition processors for synchronized processing of a data stream.

12 Claims, 14 Drawing Sheets

(56) References Cited

U.S. PATENT DOCUMENTS

| | | | |
|---|---|---|---|
| 4,153,897 A | 5/1979 | Yasuda et al. | |
| 4,204,193 A | 5/1980 | Schroeder | |
| 4,414,685 A | 11/1983 | Sternberg | |
| 4,748,674 A | 5/1988 | Freeman | |
| 4,876,643 A | 10/1989 | McNeill et al. | |
| 5,014,327 A | 5/1991 | Potter et al. | |
| 5,028,821 A | 7/1991 | Kaplinsky | |
| 5,073,864 A * | 12/1991 | Methvin | G06F 7/02 708/212 |
| 5,216,748 A | 6/1993 | Quenot et al. | |
| 5,257,361 A | 10/1993 | Doi et al. | |
| 5,287,523 A | 2/1994 | Allison et al. | |
| 5,291,482 A | 3/1994 | McHarg et al. | |
| 5,300,830 A | 4/1994 | Hawes | |
| 5,331,227 A | 7/1994 | Hawes | |
| 5,357,512 A | 10/1994 | Khaira et al. | |
| 5,357,626 A | 10/1994 | Johnson et al. | |
| 5,371,878 A | 12/1994 | Coker | |
| 5,377,129 A | 12/1994 | Molvig et al. | |
| 5,459,798 A | 10/1995 | Bailey et al. | |
| 5,459,836 A * | 10/1995 | Whittaker | G06F 15/167 709/213 |
| 5,483,642 A | 1/1996 | Okazawa et al. | |
| 5,590,284 A | 12/1996 | Crosetto | |
| 5,615,237 A | 3/1997 | Chang et al. | |
| 5,659,551 A | 8/1997 | Huott et al. | |
| 5,723,984 A | 3/1998 | Sharpe-Geisier | |
| 5,752,068 A | 5/1998 | Gilbert | |
| 5,754,878 A | 5/1998 | Asghar et al. | |
| 5,790,531 A | 8/1998 | Ellebracht et al. | |
| 5,881,312 A | 3/1999 | Dulong | |
| 5,896,548 A | 4/1999 | Ofek | |
| 5,905,881 A | 5/1999 | Tran et al. | |
| 5,956,741 A | 9/1999 | Jones | |
| 6,011,407 A | 1/2000 | New | |
| 6,016,361 A | 1/2000 | Hongu et al. | |
| 6,034,963 A | 3/2000 | Minami et al. | |
| 6,041,405 A | 3/2000 | Green | |
| 6,052,766 A | 4/2000 | Betker et al. | |
| 6,058,469 A | 5/2000 | Baxter | |
| 6,088,517 A | 7/2000 | Wanner et al. | |
| 6,122,679 A | 9/2000 | Wunderlich | |
| 6,151,644 A | 11/2000 | Wu | |
| 6,240,003 B1 | 5/2001 | McElroy | |
| 6,279,128 B1 | 8/2001 | Arnold et al. | |
| 6,317,427 B1 | 11/2001 | Augusta et al. | |
| 6,362,868 B1 | 3/2002 | Silverbrook | |
| 6,400,996 B1 | 6/2002 | Hoffberg et al. | |
| 6,606,699 B2 | 8/2003 | Pechanek et al. | |
| 6,614,703 B2 | 9/2003 | Pitts et al. | |
| 6,625,740 B1 | 9/2003 | Datar et al. | |
| 6,631,466 B1 * | 10/2003 | Chopra | H04L 29/06 707/999.006 |
| 6,633,443 B1 | 10/2003 | Watanabe et al. | |
| 6,636,483 B1 | 10/2003 | Pannell | |
| 6,640,262 B1 | 10/2003 | Uppunda et al. | |
| 6,697,979 B1 | 2/2004 | Vorbach et al. | |
| 6,700,404 B1 | 3/2004 | Feng et al. | |
| 6,880,087 B1 | 4/2005 | Carter | |
| 6,906,938 B2 | 6/2005 | Kaginele | |
| 6,944,710 B2 | 9/2005 | Regev et al. | |
| 6,977,897 B1 | 12/2005 | Nelson et al. | |
| 7,010,639 B2 | 3/2006 | Larson et al. | |
| 7,089,352 B2 | 8/2006 | Regev et al. | |
| 7,146,643 B2 | 12/2006 | Dapp et al. | |
| 7,176,717 B2 | 2/2007 | Sunkavalli et al. | |
| 7,276,934 B1 | 10/2007 | Young | |
| 7,305,047 B1 | 12/2007 | Turner | |
| 7,358,761 B1 | 4/2008 | Sunkavalli et al. | |
| 7,366,352 B2 | 4/2008 | Kravec et al. | |
| 7,392,229 B2 | 6/2008 | Harris et al. | |
| 7,428,722 B2 | 9/2008 | Sunkavalli et al. | |
| 7,487,131 B2 | 2/2009 | Harris et al. | |
| 7,487,542 B2 | 2/2009 | Boulanger | |
| 7,499,464 B2 | 3/2009 | Ayrapetian et al. | |
| 7,613,902 B1 | 11/2009 | Martin et al. | |
| 7,725,510 B2 | 5/2010 | Alicherry et al. | |
| 7,774,286 B1 | 8/2010 | Harris | |
| 7,804,719 B1 | 9/2010 | Chirania et al. | |
| 7,827,168 B2 | 11/2010 | Bernard | |
| 7,890,923 B2 | 2/2011 | Elaasar | |
| 7,899,052 B1 | 3/2011 | Hao et al. | |
| 7,917,684 B2 | 3/2011 | Noyes et al. | |
| 7,970,964 B2 | 6/2011 | Noyes | |
| 8,015,530 B1 | 9/2011 | Sinclair et al. | |
| 8,020,131 B1 | 9/2011 | Van Mau et al. | |
| 8,065,249 B1 | 11/2011 | Harris | |
| 8,140,780 B2 | 3/2012 | Noyes | |
| 8,146,040 B1 | 3/2012 | Janneck et al. | |
| 8,159,900 B2 | 4/2012 | Moore et al. | |
| 8,209,521 B2 | 6/2012 | Noyes et al. | |
| 8,214,672 B2 | 7/2012 | Pawlowski | |
| 8,239,660 B2 | 8/2012 | Cervini | |
| 8,281,395 B2 | 10/2012 | Pawlowski | |
| 8,294,490 B1 | 10/2012 | Kaviani | |
| 8,365,172 B2 * | 1/2013 | Fontenot | G06F 9/5038 718/102 |
| 8,402,188 B2 | 3/2013 | Noyes et al. | |
| 8,536,896 B1 | 9/2013 | Trimberger | |
| 8,593,175 B2 | 11/2013 | Noyes et al. | |
| 8,648,621 B2 | 2/2014 | Noyes et al. | |
| 8,680,888 B2 | 3/2014 | Brown et al. | |
| 8,725,961 B2 | 5/2014 | Noyes | |
| 8,782,624 B2 | 7/2014 | Brown et al. | |
| 8,843,523 B2 | 9/2014 | Noyes | |
| 8,938,590 B2 | 1/2015 | Noyes et al. | |
| 9,058,465 B2 | 6/2015 | Noyes et al. | |
| 9,063,532 B2 | 6/2015 | Brown | |
| 9,075,428 B2 | 7/2015 | Brown | |
| 9,118,327 B2 | 8/2015 | Noyes et al. | |
| 9,164,945 B2 | 10/2015 | Noyes | |
| 9,235,798 B2 | 1/2016 | Brown et al. | |
| 9,348,784 B2 | 5/2016 | Noyes | |
| 2002/0147825 A1 * | 10/2002 | Stein | G06F 7/02 709/230 |
| 2002/0186044 A1 | 12/2002 | Agrawal et al. | |
| 2003/0107996 A1 | 6/2003 | Black et al. | |
| 2003/0142698 A1 | 7/2003 | Parhl | |
| 2003/0163615 A1 | 8/2003 | Yu | |
| 2003/0200464 A1 | 10/2003 | Kidron | |
| 2003/0226002 A1 | 12/2003 | Boutaud et al. | |
| 2004/0100980 A1 | 5/2004 | Jacobs et al. | |
| 2004/0125807 A1 | 7/2004 | Liu et al. | |
| 2004/0151211 A1 | 8/2004 | Snider | |
| 2004/0184662 A1 | 9/2004 | Kravec et al. | |
| 2005/0154916 A1 | 7/2005 | Boulanger et al. | |
| 2005/0251638 A1 | 11/2005 | Boutaud et al. | |
| 2006/0158219 A1 | 7/2006 | Sunkavalli et al. | |
| 2006/0195496 A1 | 8/2006 | Vadi et al. | |
| 2006/0206875 A1 | 9/2006 | Ullmann et al. | |
| 2006/0257043 A1 | 11/2006 | Chiu | |
| 2006/0274001 A1 | 12/2006 | Guttag et al. | |
| 2006/0288070 A1 | 12/2006 | Vadi et al. | |
| 2007/0005869 A1 | 1/2007 | Balraj et al. | |
| 2007/0075878 A1 | 4/2007 | Furodet et al. | |
| 2007/0127482 A1 | 6/2007 | Harris et al. | |
| 2007/0150623 A1 | 6/2007 | Kravec et al. | |
| 2007/0282833 A1 | 12/2007 | McMillen et al. | |
| 2007/0283108 A1 | 12/2007 | Isherwood et al. | |
| 2008/0005379 A1 | 1/2008 | Berenbaum et al. | |
| 2008/0126690 A1 | 5/2008 | Rajan et al. | |
| 2008/0129334 A1 | 6/2008 | Sunkavalli et al. | |
| 2008/0133874 A1 | 6/2008 | Capek et al. | |
| 2008/0140661 A1 | 6/2008 | Pandya | |
| 2008/0178031 A1 | 7/2008 | Dong-Han | |
| 2008/0256347 A1 | 10/2008 | Eickemeyer et al. | |
| 2008/0301408 A1 | 12/2008 | Kranich | |
| 2008/0320053 A1 | 12/2008 | Iijima et al. | |
| 2009/0198952 A1 | 8/2009 | Khmeinitsky et al. | |
| 2009/0204734 A1 | 8/2009 | Strait et al. | |
| 2010/0100691 A1 | 4/2010 | Noyes et al. | |
| 2010/0100714 A1 | 4/2010 | Noyes et al. | |
| 2010/0115173 A1 | 5/2010 | Noyes | |
| 2010/0115347 A1 | 5/2010 | Noyes | |

(56) References Cited

U.S. PATENT DOCUMENTS

| | | |
|---|---|---|
| 2010/0118425 A1 | 5/2010 | Rafaelof |
| 2010/0138432 A1 | 6/2010 | Noyes |
| 2010/0138575 A1 | 6/2010 | Noyes |
| 2010/0138634 A1 | 6/2010 | Noyes |
| 2010/0138635 A1 | 6/2010 | Noyes |
| 2010/0145182 A1 | 6/2010 | Schmidt et al. |
| 2010/0174887 A1 | 7/2010 | Noyes |
| 2010/0174929 A1 | 7/2010 | Pawlowski |
| 2010/0175130 A1 | 7/2010 | Pawlowski |
| 2010/0185647 A1 | 7/2010 | Noyes |
| 2010/0325352 A1 | 12/2010 | Schuette et al. |
| 2010/0332809 A1 | 12/2010 | Noyes et al. |
| 2011/0004578 A1 | 1/2011 | Momma et al. |
| 2011/0145182 A1 | 6/2011 | Dlugosch |
| 2011/0145271 A1 | 6/2011 | Noyes et al. |
| 2011/0145544 A1 | 6/2011 | Noyes et al. |
| 2011/0161620 A1 | 6/2011 | Kaminski et al. |
| 2011/0208900 A1 | 8/2011 | Schuette et al. |
| 2011/0258360 A1 | 10/2011 | Noyes |
| 2011/0307233 A1 | 12/2011 | Tseng et al. |
| 2011/0307433 A1* | 12/2011 | Dlugosch .......... G06F 15/17362 706/45 |
| 2011/0307503 A1 | 12/2011 | Dlugosch |
| 2011/0320759 A1 | 12/2011 | Craddock et al. |
| 2012/0179854 A1 | 7/2012 | Noyes |
| 2012/0192163 A1 | 7/2012 | Glendenning |
| 2012/0192164 A1 | 7/2012 | Xu |
| 2012/0192165 A1 | 7/2012 | Xu |
| 2012/0192166 A1 | 7/2012 | Xu |
| 2013/0154685 A1 | 6/2013 | Noyes |
| 2013/0156043 A1 | 6/2013 | Brown et al. |
| 2013/0159239 A1 | 6/2013 | Brown et al. |
| 2013/0159670 A1 | 6/2013 | Noyes |
| 2013/0159671 A1 | 6/2013 | Brown et al. |
| 2013/0275709 A1 | 10/2013 | Gajapathy |
| 2014/0025614 A1 | 1/2014 | Noyes et al. |
| 2014/0025923 A1 | 1/2014 | Klein |
| 2014/0225889 A1 | 1/2014 | Brown et al. |
| 2014/0067736 A1 | 3/2014 | Noyes |
| 2014/0204956 A1 | 7/2014 | Brown et al. |
| 2014/0279776 A1 | 9/2014 | Brown et al. |
| 2014/0325494 A1 | 10/2014 | Brown et al. |

FOREIGN PATENT DOCUMENTS

| | | |
|---|---|---|
| JP | 08087462 | 4/1996 |
| JP | 10069459 | 3/1998 |
| JP | 10111862 A | 4/1998 |
| JP | 2000231549 A | 8/2000 |
| JP | 2000347708 A | 12/2000 |
| KR | 1020080097573 A | 11/2008 |
| WO | WO0065425 A1 | 11/2000 |
| WO | WO0138978 | 5/2001 |
| WO | WO03039001 A1 | 5/2003 |
| WO | WO2005036750 A1 | 4/2005 |
| WO | WO2011114120 A1 | 9/2011 |

OTHER PUBLICATIONS

PCT/US2009/061649 International Search Report dated Feb. 15, 2010.
Taiwan Application No. 098144804 Office Action dated Nov. 4, 2013.
PCT/US2012/067992 International Search Report dated Mar. 28, 2013.
PCT/US2012/068011 International Search Report dated Apr. 15, 2013.
PCT/US2012/067999 International Search Report dated May 14, 2013.
PCT/US2012/067995 International Search Report dated May 17, 2013.
PCT/US2012/067988 International Search Report (Partial) dated Jun. 24, 2014.
PCT/US2013/049744 International Search Report and Written Opinion dated Oct. 22, 2013.
PCT/US2013/049748 International Search Report and Written Opinion dated Oct. 22, 2013.
PCT/US2013/049755 International Search Report and Written Opinion dated Oct. 24, 2013.
PCT/US2013/049753 International Search Report and Written Opinion dated Nov. 7, 2013.
PCT/US2013/055434 International Search Report and Written Opinion dated Nov. 29, 2013.
PCT/US2013/055438 International Search Report and Written Opinion dated Nov. 29, 2013.
PCT/US2013/055436 International Search Report and Written Opinion dated Dec. 9, 2013.
PCT/US2014/023589 International Search Report and Written Opinion dated Jul. 24, 2014.
Soewito et al., "Self-Addressable Memory-Based FSM: A scalable Intrusion Detection Engine", IEEE Network, pp. 14-21; Feb. 2009.
Carpenter et al., "A Massively Parallel Architecture for a Self-Organizing Neural Pattern Recognition Machine", Academic Press, Inc.; 1987.
Cong et al., "Application-Specific Instruction Generation for Configurable Processor Architectures", Computer Science Department, University of California, ACM; 2004.
Glette et al., "An Online EHW Pattern Recognition System Applied to Face Image Recognition", University of Oslo, Norway; 2007.
Kawai et al., "An Adaptive Pattern Recognition Hardware with On-chip Shift Register-based Partial Reconfiguration", IEEE; 2008.
Kutrib et al., "Massively Parallel Pattern Recognition with Link Features", IFIG Research Report 0003; 2000.
Marculescu et al., Power Management of Multi-Core Systems: Challenges, Approaches, and Recent Developments Tutorial at ASPLOS, London, UK [online]; Mar. 4, 2012.
Vitanen et al.; Image Pattern Recognition Using Configurable Logic Cell Array; New Advances in Computer Graphics; pp. 355-368; 1989.
Yasunaga et al., "Kernel-based Pattern Recognition Hardware: Its Design Methodology Using Evolved Truth Tables", IEEE, 2000.
U.S. Appl. No. 61/788,364, filed Mar. 15, 2013, Brown et al.
Kahle et al., "Introduction to the Cell Multiprocessor", IBM J. Res. & Dev., Jul./Sep. 2005, vol. 49, No. 4/5, pp. 589-604.
Scarpazza et al., "High-Speed String Searching against Large Dictionaries on the Cell/B.E. Processor", IEEE, Mar. 2008, 978-1-4244-1694.
Beesley, K. R.; Arabic Morphology Using Only Finite-State Operations; Xerox Research Centre Europe; pp. 50-57; 1998.
Bird, S. et al.; One-Level Phonology: Autosegmental Representations and Rules as Finite Automata; Association for Computational Linguistics; University of Edinburgh; vol. 20; No. 1; pp. 55-90; 1994.
Bispo, J. et al.; Regular Expression Matching for Reconfigurable Packet Inspection; IEEE International Conference on Field Programmable Technology; 2006.
Bispo, J. et al.; Synthesis of Regular Expressions Targeting FPGAs: Current Status and Open Issues; IST/INESC-ID, Libson, Portugal; pp. 1-12; 2007.
Brodie, B. et al.; A scalable Architecture for High-Throughput Regular-Expression Pattern Matching; Exegy Inc.; pp. 1-12; 2006.
Clark, C.; Design of Efficient FPGA Circuits for Matching Complex Patterns in Network Intrusion Detection Systems (Master of Science Thesis); Georgia Institute of Technology; pp. 1-56; Dec. 2003.
Clark, C.; A Unified Model of Pattern-Matching Circuits for Field-Programmable Gate Arrays [Doctoral Dissertation]; Georgia Institute of Technology; pp. 1-177; 2006.
Clark, C. et al.; Scalable Pattern Matching for High Speed Networks; Proceedings of the 12$^{th}$ Annual IEEE symposium on Field-Programmable Custom Computing Machines (FCCM'04);Georgia Institute of Technology; pp. 1-9; 2004.
Clark, C. et al.; A Unified Model of Pattern-Matching Circuit Architectures; Tech Report GIT-CERCS-05-20;Georgia Institute of Technology; pp. 1-17; 2005.
Fide, S.; String Processing in Hardware; Scalable Parallel and Distributed Systems Lab; Proceedings of the 12$^{th}$ Annual IEEE

(56) References Cited

OTHER PUBLICATIONS symposium on Field-Programmable Custom Computing Machines (FCCM'04);School of Electrical and Computer Engineering; Georgia Institute of Technology; pp. 1-9; 2004.

Fisk, M. et al.; Applying Fast String Matching to Intrusion Detection; Los Alamos National Laboratory; University of California San Diego; pp. 1-21; 2002.

Korenek, J.; Traffic Scanner-Hardware Accelerated Intrusion Detection System; http://www.liberouter.org/ ; 2006.

Kumar, S. et al.; Curing Regular Expressions matching Algorithms from Insomnia, Amnesia, and Acaluia; Department of Computer Science and Engineering; Washington University in St. Louis; pp. 1-17; Apr. 27, 2007.

Lipovski, G.; Dynamic Systolic Associative Memory Chip; IEEE; Department of Electrical and Computer Engineering; University of Texas at Austin; pp. 481-492; 1990.

Lin, C. et al.; Optimization of Pattern Matching Circuits for Regular Expression on FPGA; IEEE Transactions on Very Large Scale Integrations Systems; vol. 15, No. 12, pp. 1-6; Dec. 2007.

Schultz, K. et al.; Fully Parallel Integrated CAM/RAM Using Preclassification to Enable Large Capacities; IEEE Journal on Solid-State Circuits; vol. 31; No. 5; pp. 689-699; May 1996.

Shafai, F. et al.; Fully Parallel 30-MHz, 2.5-Mb CAM; IEEE Journal of Solid-State Circuits, vol. 33; No. 11; pp. 1690-1696; Nov. 1998.

Sidhu, R. et al.; Fast Regular Expression Pattern Matching using FPGAs; Department of EE-Systems; University of Southern California; pp. 1-12.

Wada, T.; Multiobject Behavior Recognition Event Driven Selective Attention Method; IEEE; pp. 1-16; 2000.

Yu, F.; High Speed Deep Packet Inspection with Hardware Support; Electrical Engineering and Computer Sciences; University of California at Berkeley; pp. 1-217; Nov. 22, 2006.

Freescale and KASPERSKY ® Accelerated Antivirus Solution Platform for OEM Vendors; Freescale Semiconductors Document; pp. 1-16; 2007.

Hurson A. R.; A VLSI Design for the Parallel Finite State Automation and Its Performance Evaluation as a Hardware Scanner; International Journal of Computer and Information Sciences, vol. 13, No. 6; 1984.

U.S. Appl. No. 60/652,738, filed Feb. 12, 2005, Harris.

\* cited by examiner

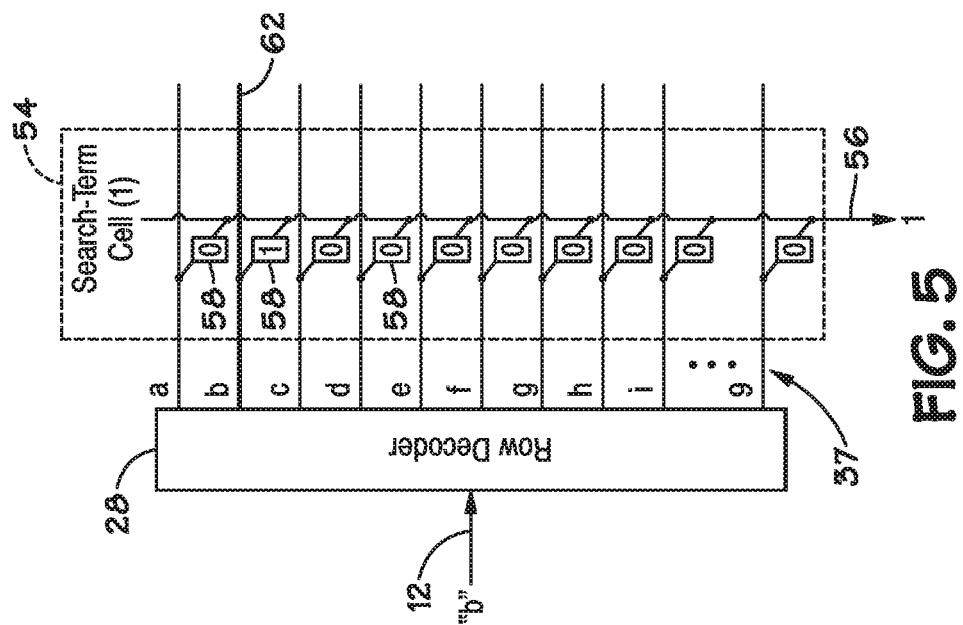
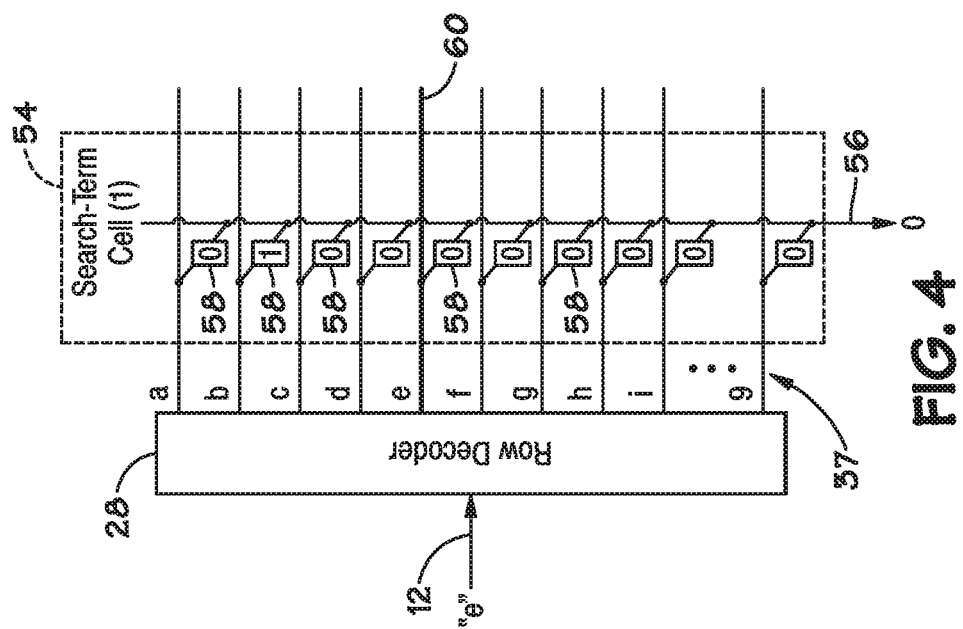

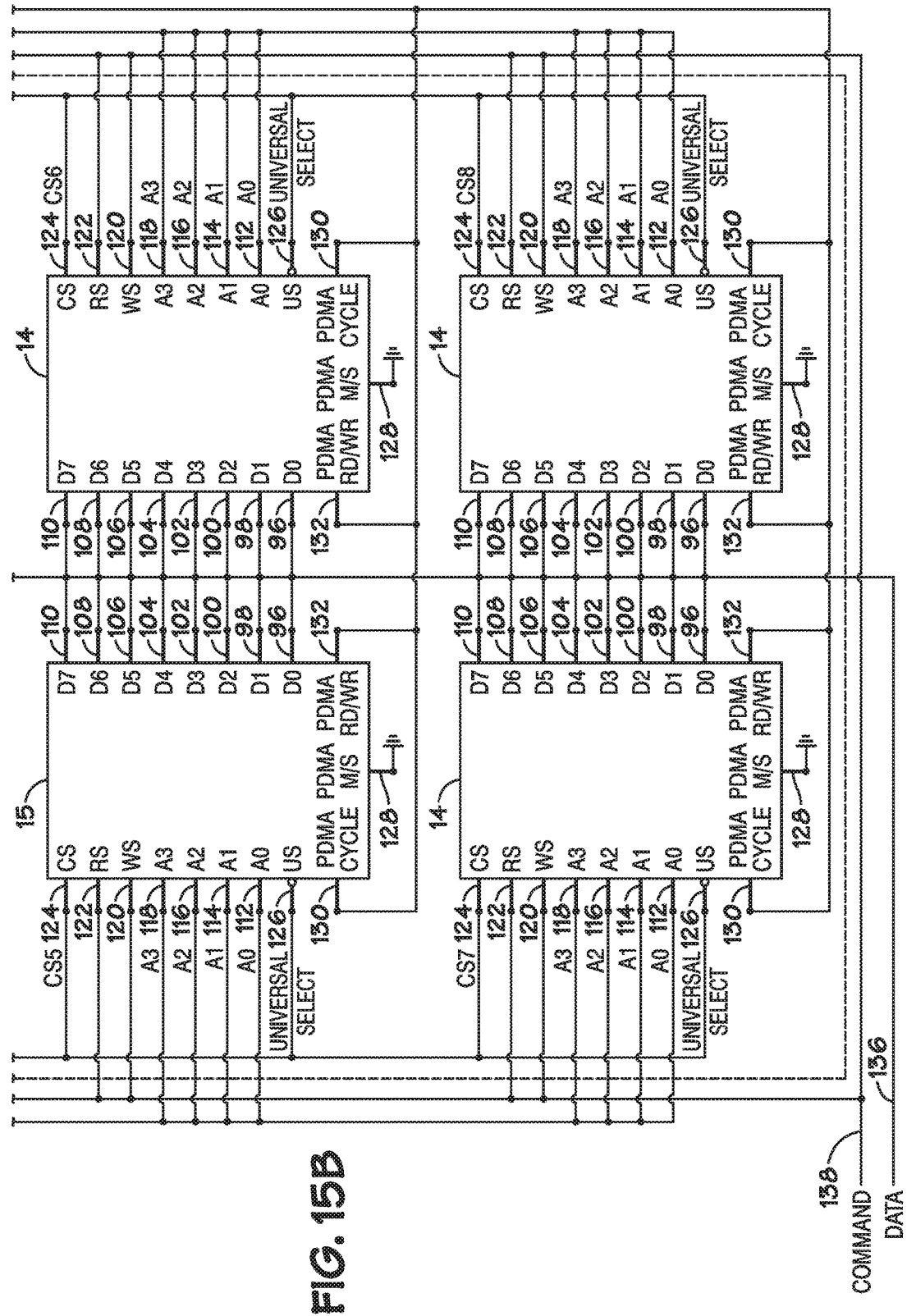

DEVICES, SYSTEMS, AND METHODS TO SYNCHRONIZE SIMULTANEOUS DMA PARALLEL PROCESSING OF A SINGLE DATA STREAM BY MULTIPLE DEVICES

CROSS REFERENCE TO RELATED APPLICATIONS

This application is a Continuation Application of U.S. patent application Ser. No. 15/208,419, entitled "Devices, Systems, and Methods to Synchronize Simultaneous DMA Parallel Processing of a Single Data Stream by Multiple Devices", filed Jul. 12, 2016, which is a Continuation Application of U.S. patent application Ser. No. 12/325,986, entitled "Devices, Systems, and Methods to Synchronize Simultaneous DMA Parallel Processing of a Single Data Stream by Multiple Devices", filed Dec. 1, 2008, which is herein incorporated by reference.

BACKGROUND

Field of Invention

Embodiments of the invention relate generally to pattern-recognition processors and, more specifically, in certain embodiments, to the synchronization of direct memory access controlled operations of the pattern-recognition processors.

Description of Related Art

In the field of computing, pattern recognition tasks are increasingly challenging. Ever larger volumes of data are transmitted between computers, and the number of patterns that users wish to identify is increasing. For example, spam and malware are often detected by searching for patterns in a data stream, e.g., particular phrases or pieces of code. The number of patterns increases with the variety of spam and malware, as new patterns may be implemented to search for new variants. Searching a data stream for each of these patterns can form a computing bottleneck. Often, as the data stream is received, it is searched for each pattern, one at a time. The delay before the system is ready to search the next portion of the data stream increases with the number of patterns. Thus, pattern recognition may slow the receipt of data.

Furthermore, efforts to increase the speed at which the data stream is searched can lead to synchronization problems with the data, as well as timing issues with regard to control of both the processing of an input data stream to the system and the output of the results of the searched data stream. Accordingly, a system is needed that may increase the speed at which a data stream may be searched, while maintaining a properly timed processing and flow of information both into and out of the system.

BRIEF DESCRIPTION OF DRAWINGS

FIGS. 4 and 5 depict the search-term cell of FIG. 3 searching the data stream for a single character;

FIGS. 15A-15B depict a detailed example of control circuitry and input busses used in conjunction with the pattern-recognition processor cluster of FIG. 14.

DETAILED DESCRIPTION

Figure 1:
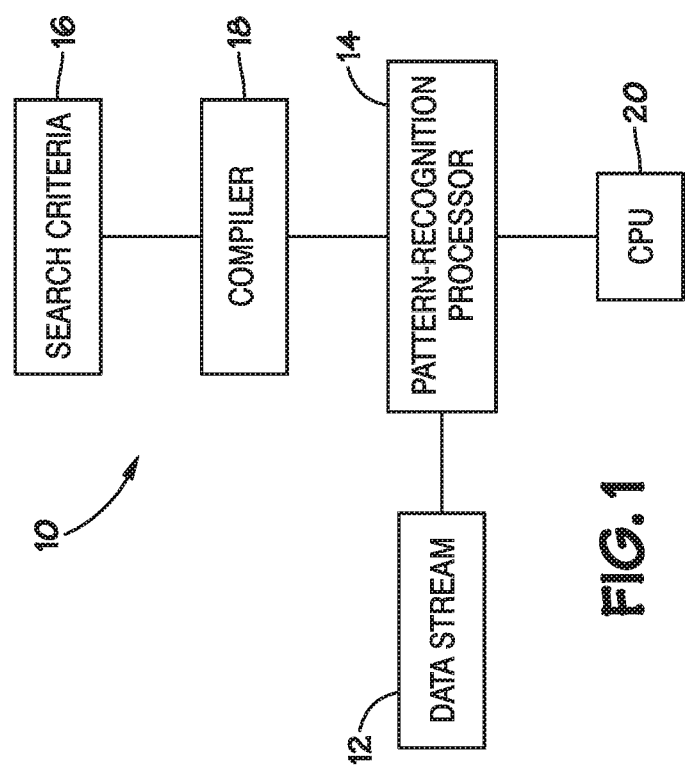
FIG. 1 depicts an example of system that searches a data stream.

FIG. 1 depicts an example of a system 10 that searches a data stream 12. The system 10 may include a pattern-recognition processor 14 that searches the data stream 12 according to search criteria 16.

Each search criterion may specify one or more target expressions, i.e., patterns. The phrase "target expression" refers to a sequence of data for which the pattern-recognition processor 14 is searching. Examples of target expressions include a sequence of characters that spell a certain word, a sequence of genetic base pairs that specify a gene, a sequence of bits in a picture or video file that form a portion of an image, a sequence of bits in an executable file that form a part of a program, or a sequence of bits in an audio file that form a part of a song or a spoken phrase.

A search criterion may specify more than one target expression. For example, a search criterion may specify all five-letter words beginning with the sequence of letters "cl", any word beginning with the sequence of letters "cl", a paragraph that includes the word "cloud" more than three times, etc. The number of possible sets of target expressions is arbitrarily large, e.g., there may be as many target expressions as there are permutations of data that the data stream could present. The search criteria may be expressed in a variety of formats, including as regular expressions, a programming language that concisely specifies sets of target expressions without necessarily listing each target expression.

Each search criterion may be constructed from one or more search terms. Thus, each target expression of a search criterion may include one or more search terms and some target expressions may use common search terms. As used herein, the phrase "search term" refers to a sequence of data that is searched for, during a single search cycle. The sequence of data may include multiple bits of data in a binary format or other formats, e.g., base ten, ASCII, etc. The sequence may encode the data with a single digit or multiple digits, e.g., several binary digits. For example, the pattern-recognition processor 14 may search a text data stream 12 one character at a time, and the search terms may specify a set of single characters, e.g., the letter "a", either the letters "a" or "e", or a wildcard search term that specifies a set of all single characters.

Search terms may be smaller or larger than the number of bits that specify a character (or other grapheme—i.e., fundamental unit—of the information expressed by the data stream, e.g., a musical note, a genetic base pair, a base-10 digit, or a sub-pixel). For instance, a search term may be 8 bits and a single character may be 16 bits, in which case two consecutive search terms may specify a single character.

The search criteria 16 may be formatted for the pattern-recognition processor 14 by a compiler 18. Formatting may include deconstructing search terms from the search criteria. For example, if the graphemes expressed by the data stream 12 are larger than the search terms, the compiler may deconstruct the search criterion into multiple search terms to search for a single grapheme. Similarly, if the graphemes expressed by the data stream 12 are smaller than the search terms, the compiler 18 may provide a single search term, with unused bits, for each separate grapheme. The compiler 18 may also format the search criteria 16 to support various regular expressions operators that are not natively supported by the pattern-recognition processor 14.

The pattern-recognition processor 14 may search the data stream 12 by evaluating each new term from the data stream 12. The word "term" here refers to the amount of data that could match a search term. During a search cycle, the pattern-recognition processor 14 may determine whether the currently presented term matches the current search term in the search criterion. If the term matches the search term, the evaluation is "advanced", i.e., the next term is compared to the next search term in the search criterion. If the term does not match, the next term is compared to the first term in the search criterion, thereby resetting the search.

Each search criterion may be compiled into a different finite state machine in the pattern-recognition processor 14. The finite state machines may run in parallel, searching the data stream 12 according to the search criteria 16. The finite state machines may step through each successive search term in a search criterion as the preceding search term is matched by the data stream 12, or if the search term is unmatched, the finite state machines may begin searching for the first search term of the search criterion.

The pattern-recognition processor 14 may evaluate each new term according to several search criteria, and their respective search terms, at about the same time, e.g., during a single device cycle. The parallel finite state machines may each receive the term from the data stream 12 at about the same time, and each of the parallel finite state machines may determine whether the term advances the parallel finite state machine to the next search term in its search criterion. The parallel finite state machines may evaluate terms according to a relatively large number of search criteria, e.g., more than 100, more than 1000, or more than 10,000. Because they operate in parallel, they may apply the search criteria to a data stream 12 having a relatively high bandwidth, e.g., a data stream 12 of greater than or generally equal to 64 MB per second or 128 MB per second, without slowing the data stream. In some embodiments, the search-cycle duration does not scale with the number of search criteria, so the number of search criteria may have little to no effect on the performance of the pattern-recognition processor 14.

When a search criterion is satisfied (i.e., after advancing to the last search term and matching it), the pattern-recognition processor 14 may report the satisfaction of the criterion to a processing unit, such as a central processing unit (CPU) 20. The central processing unit 20 may control the pattern-recognition processor 14 and other portions of the system 10.

The system 10 may be any of a variety of systems or devices that search a stream of data. For example, the system 10 may be a desktop, laptop, handheld or other type of computer that monitors the data stream 12. The system 10 may also be a network node, such as a router, a server, or a client (e.g., one of the previously-described types of computers). The system 10 may be some other sort of electronic device, such as a copier, a scanner, a printer, a game console, a television, a set-top video distribution or recording system, a cable box, a personal digital media player, a factory automation system, an automotive computer system, or a medical device. (The terms used to describe these various examples of systems, like many of the other terms used herein, may share some referents and, as such, should not be construed narrowly in virtue of the other items listed.)

The data stream 12 may be one or more of a variety of types of data streams that a user or other entity might wish to search. For example, the data stream 12 may be a stream of data received over a network, such as packets received over the Internet or voice or data received over a cellular network. The data stream 12 may be data received from a sensor in communication with the system 10, such as an imaging sensor, a temperature sensor, an accelerometer, or the like, or combinations thereof. The data stream 12 may be received by the system 10 as a serial data stream, in which the data is received in an order that has meaning, such as in a temporally, lexically, or semantically significant order. Or the data stream 12 may be received in parallel or out of order and, then, converted into a serial data stream, e.g., by reordering packets received over the Internet. In some embodiments, the data stream 12 may present terms serially, but the bits expressing each of the terms may be received in parallel. The data stream 12 may be received from a source external to the system 10, or may be formed by interrogating a memory device and forming the data stream 12 from stored data.

Depending on the type of data in the data stream 12, different types of search criteria may be chosen by a designer. For instance, the search criteria 16 may be a virus definition file. Viruses or other malware may be characterized, and aspects of the malware may be used to form search criteria that indicate whether the data stream 12 is likely delivering malware. The resulting search criteria may be stored on a server, and an operator of a client system may subscribe to a service that downloads the search criteria to the system 10. The search criteria 16 may be periodically updated from the server as different types of malware emerge. The search criteria may also be used to specify undesirable content that might be received over a network, for instance unwanted emails (commonly known as spam) or other content that a user finds objectionable.

The data stream 12 may be searched by a third party with an interest in the data being received by the system 10. For example, the data stream 12 may be monitored for text, a sequence of audio, or a sequence of video that occurs in a copyrighted work. The data stream 12 may be monitored for utterances that are relevant to a criminal investigation or civil proceeding or are of interest to an employer.

The search criteria 16 may also include patterns in the data stream 12 for which a translation is available, e.g., in memory addressable by the CPU 20 or the pattern-recognition processor 14. For instance, the search criteria 16 may each specify an English word for which a corresponding Spanish word is stored in memory. In another example, the search criteria 16 may specify encoded versions of the data stream 12, e.g., MP3, MPEG 4, FLAC, Ogg Vorbis, etc., for which a decoded version of the data stream 12 is available, or vice versa.

The pattern recognition processor 14 may be hardware that is integrated with the CPU 20 into a single component (such as a single device) or may be formed as a separate component. For instance, the pattern-recognition processor 14 may be a separate integrated circuit. The pattern-recognition processor 14 may be referred to as a "co-processor" or a "pattern-recognition co-processor".

Figure 2:
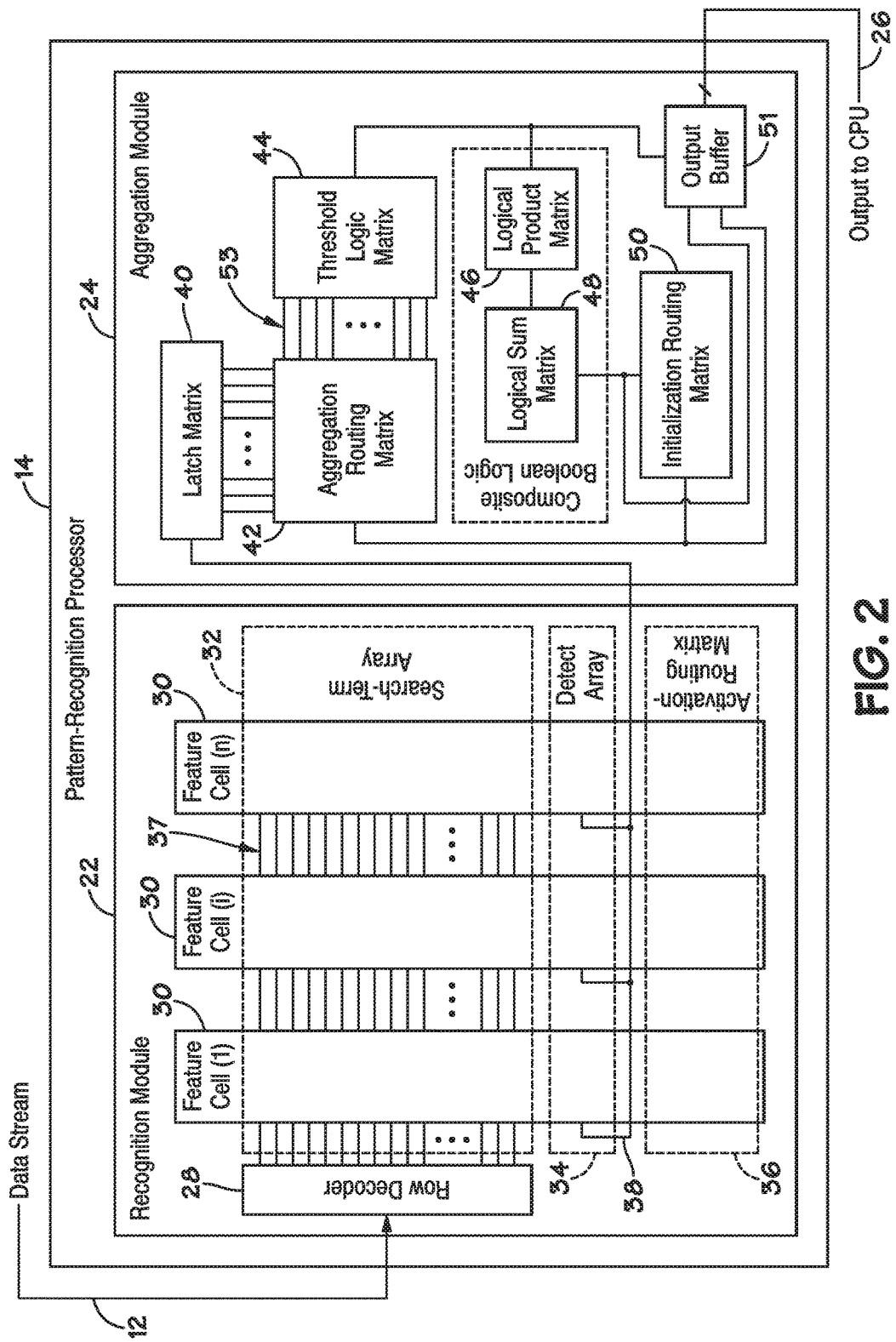
FIG. 2 depicts an example of a pattern-recognition processor in the system of FIG. 1.

FIG. 2 depicts an example of the pattern-recognition processor 14. The pattern-recognition processor 14 may include a recognition module 22 and an aggregation module 24. The recognition module 22 may be configured to compare received terms to search terms, and both the recognition module 22 and the aggregation module 24 may cooperate to determine whether matching a term with a search term satisfies a search criterion.

The recognition module 22 may include a row decoder 28 and a plurality of feature cells 30. Each feature cell 30 may specify a search term, and groups of feature cells 30 may form a parallel finite state machine that forms a search criterion. Components of the feature cells 30 may form a search-term array 32, a detection array 34, and an activation-routing matrix 36. The search-term array 32 may include a plurality of input conductors 37, each of which may place each of the feature cells 30 in communication with the row decoder 28.

The row decoder 28 may select particular conductors among the plurality of input conductors 37 based on the content of the data stream 12. For example, the row decoder 28 may be a one byte to 256 row decoder that activates one of 256 rows based on the value of a received byte, which may represent one term. A one-byte term of 0000 0000 may correspond to the top row among the plurality of input conductors 37, and a one-byte term of 1111 1111 may correspond to the bottom row among the plurality of input conductors 37. Thus, different input conductors 37 may be selected, depending on which terms are received from the data stream 12. As different terms are received, the row decoder 28 may deactivate the row corresponding to the previous term and activate the row corresponding to the new term.

The detection array 34 may couple to a detection bus 38 that outputs signals indicative of complete or partial satisfaction of search criteria to the aggregation module 24. The activation-routing matrix 36 may selectively activate and deactivate feature cells 30 based on the number of search terms in a search criterion that have been matched.

The aggregation module 24 may include a latch matrix 40, an aggregation-routing matrix 42, a threshold-logic matrix 44, a logical-product matrix 46, a logical-sum matrix 48, and an initialization-routing matrix 50.

The latch matrix 40 may implement portions of certain search criteria. Some search criteria, e.g., some regular expressions, count only the first occurrence of a match or group of matches. The latch matrix 40 may include latches that record whether a match has occurred. The latches may be cleared during initialization, and periodically re-initialized during operation, as search criteria are determined to be satisfied or not further satisfiable—i.e., an earlier search term may need to be matched again before the search criterion could be satisfied.

The aggregation-routing matrix 42 may function similar to the activation-routing matrix 36. The aggregation-routing matrix 42 may receive signals indicative of matches on the detection bus 38 and may route the signals to different group-logic lines 53 connecting to the threshold-logic matrix 44. The aggregation-routing matrix 42 may also route outputs of the initialization-routing matrix 50 to the detection array 34 to reset portions of the detection array 34 when a search criterion is determined to be satisfied or not further satisfiable.

The threshold-logic matrix 44 may include a plurality of counters, e.g., 32-bit counters configured to count up or down. The threshold-logic matrix 44 may be loaded with an initial count, and it may count up or down from the count based on matches signaled by the recognition module 22. For instance, the threshold-logic matrix 44 may count the number of occurrences of a word in some length of text.

The outputs of the threshold-logic matrix 44 may be inputs to the logical-product matrix 46. The logical-product matrix 46 may selectively generate "product" results (e.g., "AND" function in Boolean logic). The logical-product matrix 46 may be implemented as a square matrix, in which the number of output products is equal the number of input lines from the threshold-logic matrix 44, or the logical-product matrix 46 may have a different number of inputs than outputs. The resulting product values may be output to the logical-sum matrix 48.

The logical-sum matrix 48 may selectively generate sums (e.g., "OR" functions in Boolean logic.) The logical-sum matrix 48 may also be a square matrix, or the logical-sum matrix 48 may have a different number of inputs than outputs. Since the inputs are logical products, the outputs of the logical-sum matrix 48 may be logical-Sums-of-Products (e.g., Boolean logic Sum-of-Product (SOP) form). The output of the logical-sum matrix 48 may be received by the initialization-routing matrix 50.

The initialization-routing matrix 50 may reset portions of the detection array 34 and the aggregation module 24 via the aggregation-routing matrix 42. The initialization-routing matrix 50 may also be implemented as a square matrix, or the initialization-routing matrix 50 may have a different number of inputs than outputs. The initialization-routing matrix 50 may respond to signals from the logical-sum matrix 48 and re-initialize other portions of the pattern-recognition processor 14, such as when a search criterion is satisfied or determined to be not further satisfiable.

The aggregation module 24 may include an output buffer 51 that receives the outputs of the threshold-logic matrix 44, the aggregation-routing matrix 42, and the logical-sum matrix 48. The output of the aggregation module 24 may be transmitted from the output buffer 51 to the CPU 20 (FIG. 1) on the output bus 26. In some embodiments, an output multiplexer may multiplex signals from these components 42, 44, and 48 and output signals indicative of satisfaction of criteria or matches of search terms to the CPU 20 (FIG. 1). In other embodiments, results from the pattern-recognition processor 14 may be reported without transmitting the signals through the output multiplexer, which is not to suggest that any other feature described herein could not also be omitted. For example, signals from the threshold-logic matrix 44, the logical-product matrix 46, the logical-sum matrix 48, or the initialization routing matrix 50 may be transmitted to the CPU in parallel on the output bus 26.

Figure 3:
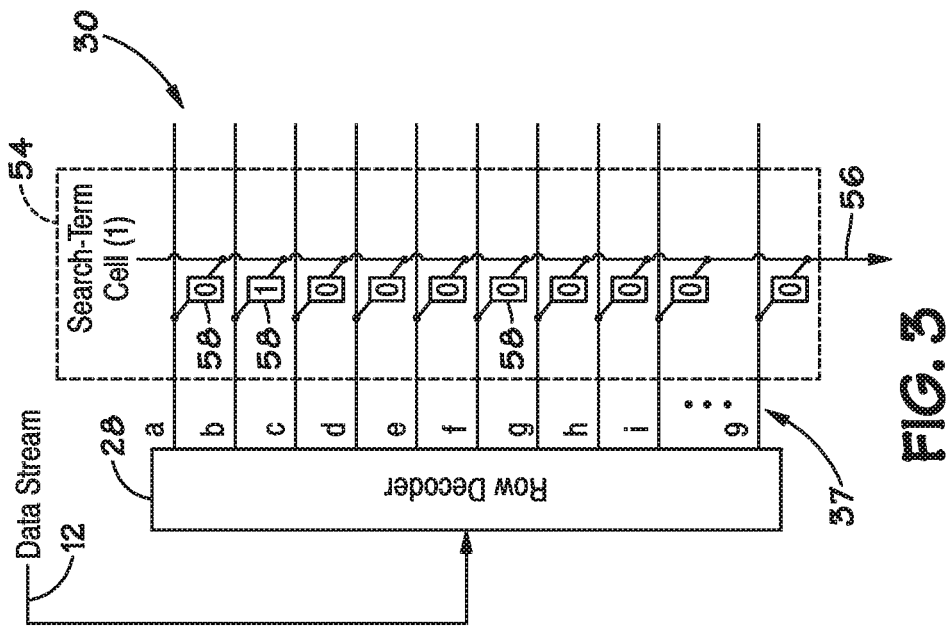
FIG. 3 depicts an example of a search-term cell in the pattern-recognition processor of FIG. 2.

FIG. 3 illustrates a portion of a single feature cell 30 in the search-term array 32 (FIG. 2), a component referred to herein as a search-term cell 54. The search-term cells 54 may include an output conductor 56 and a plurality of memory cells 58. Each of the memory cells 58 may be coupled to both the output conductor 56 and one of the conductors among the plurality of input conductors 37. In response to its input conductor 37 being selected, each of the memory cells 58 may output a value indicative of its stored value, outputting the data through the output conductor 56. In some embodiments, the plurality of input conductors 37 may be referred to as "word lines", and the output conductor 56 may be referred to as a "data line".

The memory cells 58 may include any of a variety of types of memory cells. For example, the memory cells 58 may be volatile memory, such as dynamic random access memory (DRAM) cells having a transistor and a capacitor. The source and the drain of the transistor may be connected to a plate of the capacitor and the output conductor 56, respectively, and the gate of the transistor may be connected to one of the input conductors 37. In another example of volatile memory, each of the memory cells 58 may include a static random access memory (SRAM) cell. The SRAM cell may have an output that is selectively coupled to the output conductor 56 by an access transistor controlled by one of the input conductors 37. The memory cells 58 may also include nonvolatile memory, such as phase-change memory (e.g., an ovonic device), flash memory, silicon-oxide-nitride-oxide-silicon (SONOS) memory, magneto-resistive memory, or other types of nonvolatile memory. The memory cells 58 may also include flip-flops, e.g., memory cells made out of logic gates.

FIGS. 4 and 5 depict an example of the search-term cell 54 in operation. FIG. 4 illustrates the search-term cell 54 receiving a term that does not match the cell's search term, and FIG. 5 illustrates a match.

As illustrated by FIG. 4, the search-term cell 54 may be configured to search for one or more terms by storing data in the memory cells 58. The memory cells 58 may each represent a term that the data stream 12 might present, e.g., in FIG. 3, each memory cell 58 represents a single letter or number, starting with the letter "a" and ending with the number "9". Memory cells 58 representing terms that satisfy the search term may be programmed to store a first value, and memory cells 58 that do not represent terms that satisfy the search term may be programmed to store a different value. In the illustrated example, the search-term cell 54 is configured to search for the letter "b". The memory cells 58 that represent "b" may store a 1, or logic high, and the memory cells 58 that do not represent "b" may be programmed to store a 0, or logic low.

To compare a term from the data stream 12 with the search term, the row decoder 28 may select the input conductor 37 coupled to memory cells 58 representing the received term. In FIG. 4, the data stream 12 presents a lowercase "e". This term may be presented by the data stream 12 in the form of an eight-bit ASCII code, and the row decoder 28 may interpret this byte as a row address, outputting a signal on the conductor 60 by energizing it.

In response, the memory cell 58 controlled by the conductor 60 may output a signal indicative of the data that the memory cell 58 stores, and the signal may be conveyed by the output conductor 56. In this case, because the letter "e" is not one of the terms specified by the search-term cell 54, it does not match the search term, and the search-term cell 54 outputs a 0 value, indicating no match was found.

In FIG. 5, the data stream 12 presents a character "b". Again, the row decoder 28 may interpret this term as an address, and the row decoder 28 may select the conductor 62. In response, the memory cell 58 representing the letter "b" outputs its stored value, which in this case is a 1, indicating a match.

The search-term cells 54 may be configured to search for more than one term at a time. Multiple memory cells 58 may be programmed to store a 1, specifying a search term that matches with more than one term. For instance, the memory cells 58 representing the letters lowercase "a" and uppercase "A" may be programmed to store a 1, and the search-term cell 54 may search for either term. In another example, the search-term cell 54 may be configured to output a match if any character is received. All of the memory cells 58 may be programmed to store a 1, such that the search-term cell 54 may function as a wildcard term in a search criterion.

Figure 6:
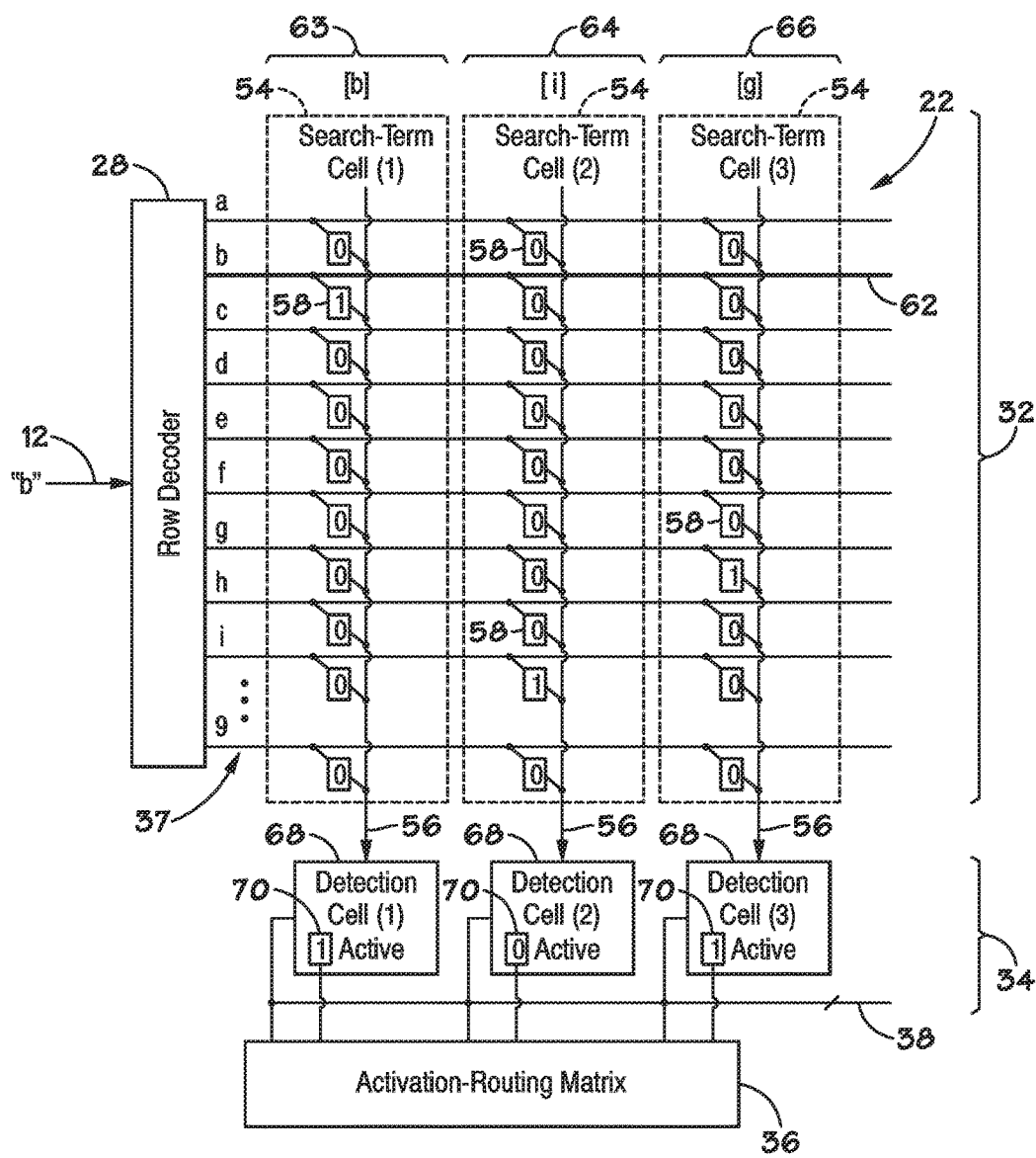
FIGS. 6-8 depict a recognition module including several search-term cells searching the data stream for a word.
Figure 7:
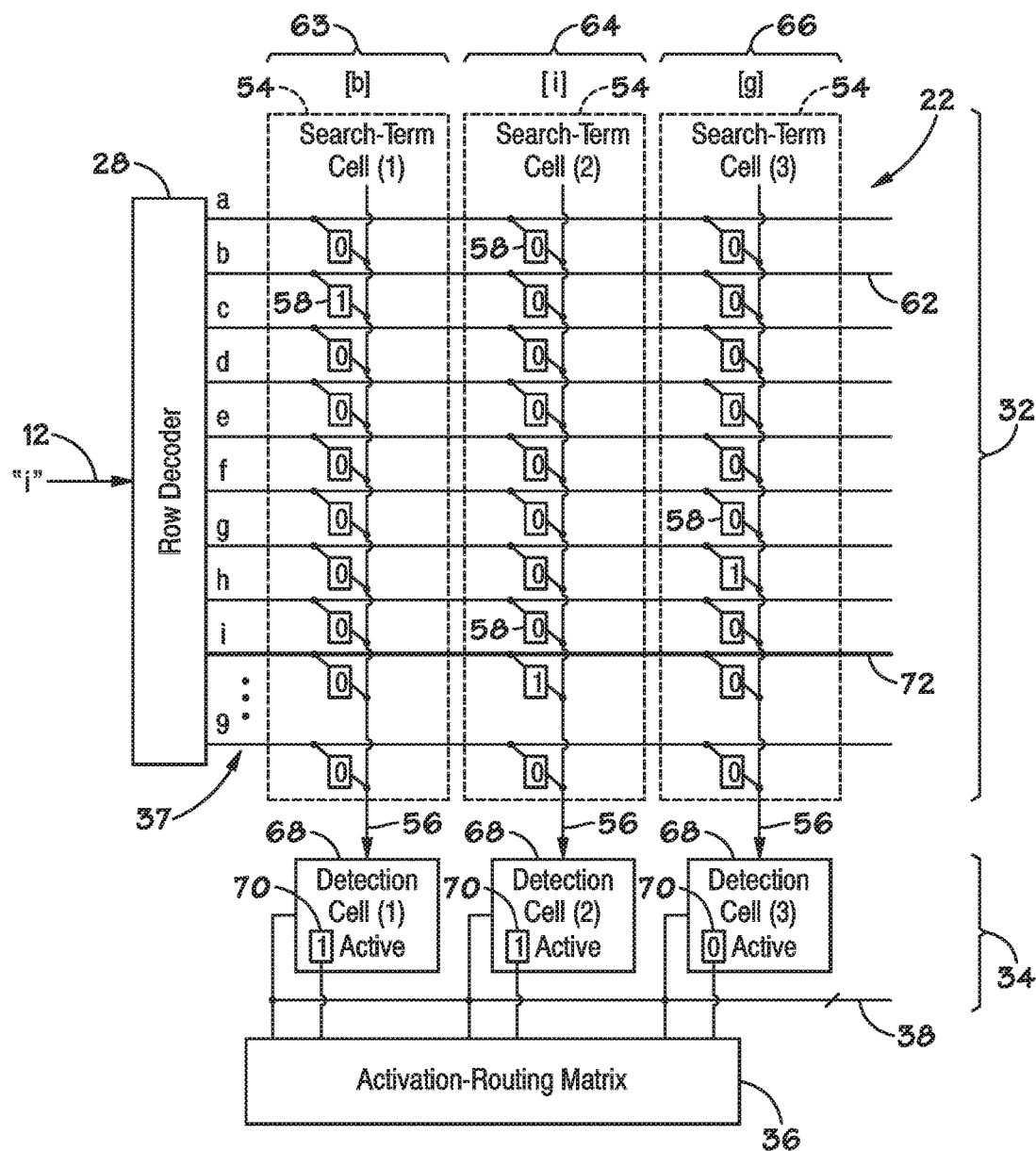
Figure 8:
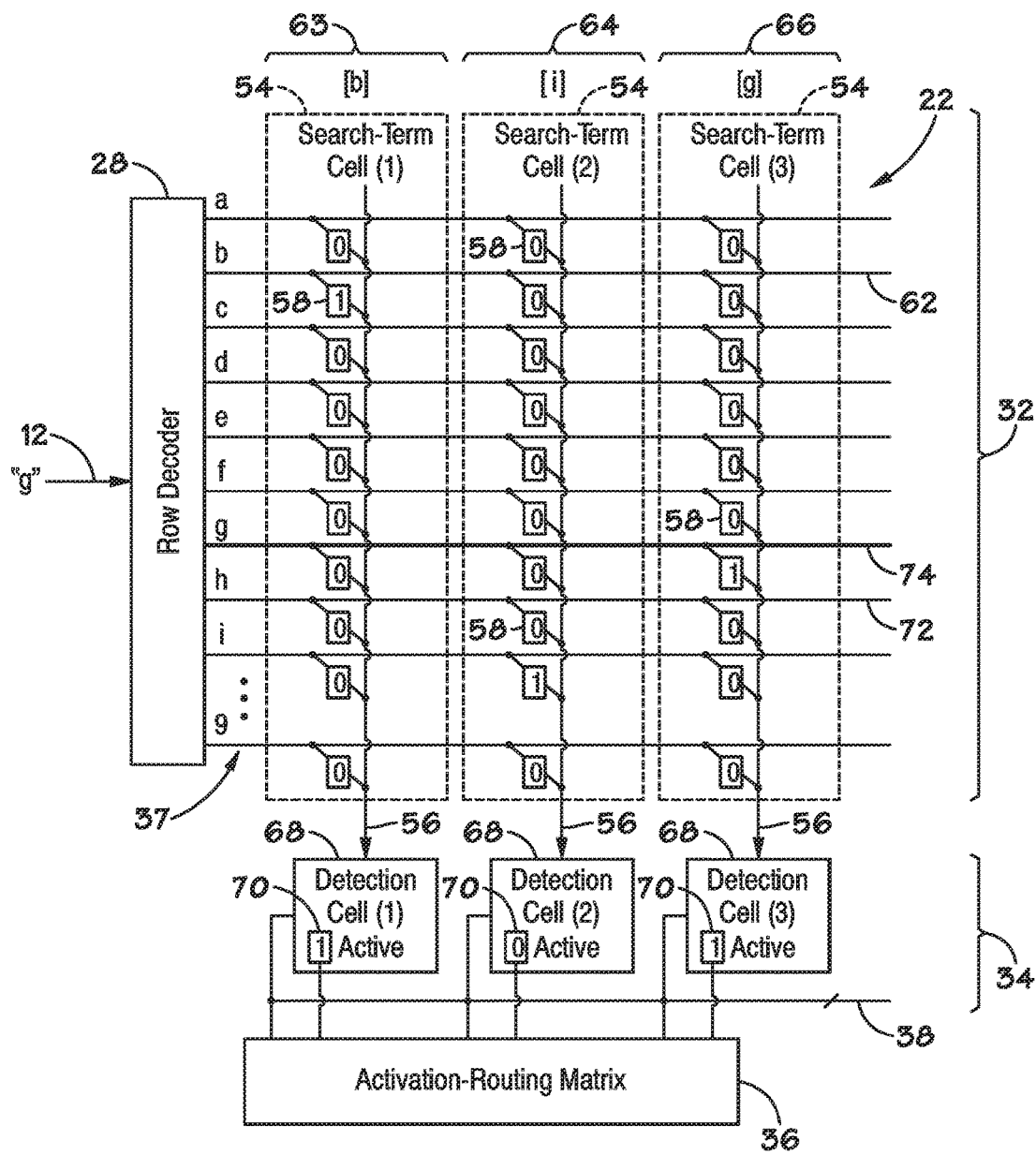

FIGS. 6-8 depict the recognition module 22 searching according to a multi-term search criterion, e.g., for a word. Specifically, FIG. 6 illustrates the recognition module 22 detecting the first letter of a word, FIG. 7 illustrates detection of the second letter, and FIG. 8 illustrates detection of the last letter.

As illustrated by FIG. 6, the recognition module 22 may be configured to search for the word "big". Three adjacent feature cells 63, 64, and 66 are illustrated. The feature cell 63 is configured to detect the letter "b". The feature cell 64 is configured to detect the letter "i". And the feature cell 66 is configured to both detect the letter "g" and indicate that the search criterion is satisfied.

FIG. 6 also depicts additional details of the detection array 34. The detection array 34 may include a detection cell 68 in each of the feature cells 63, 64, and 66. Each of the detection cells 68 may include a memory cell 70, such as one of the types of memory cells described above (e.g., a flip-flop), that indicates whether the feature cell 63, 64, or 66 is active or inactive. The detection cells 68 may be configured to output a signal to the activation-routing matrix 36 indicating whether the detection cell both is active and has received a signal from its associated search-term cell 54 indicating a match. Inactive features cells 63, 64, and 66 may disregard matches. Each of the detection cells 68 may include an AND gate with inputs from the memory cell 70 and the output conductor 56. The output of the AND gate may be routed to both the detection bus 38 and the activation-routing matrix 36, or one or the other.

The activation-routing matrix 36, in turn, may selectively activate the feature cells 63, 64, and 66 by writing to the memory cells 70 in the detection array 34. The activation-routing matrix 36 may activate feature cells 63, 64, or 66 according to the search criterion and which search term is being searched for next in the data stream 12.

In FIG. 6, the data stream 12 presents the letter "b". In response, each of the feature cells 63, 64, and 66 may output a signal on their output conductor 56, indicating the value stored in the memory cell 58 connected to the conductor 62, which represents the letter "b". The detection cells 68 may then each determine whether they have received a signal indicating a match and whether they are active. Because the feature cell 63 is configured to detect the letter "b" and is active, as indicated by its memory cell 70, the detection cell 68 in the feature cell 63 may output a signal to the activation-routing matrix 36 indicating that the first search term of the search criterion has been matched.

As illustrated by FIG. 7, after the first search term is matched, the activation-routing matrix 36 may activate the next feature cell 64 by writing a 1 to its memory cell 70 in its detection cell 68. The activation-routing matrix 36 may also maintain the active state of the feature cell 63, in case the next term satisfies the first search term, e.g., if the sequence of terms "bbig" is received. The first search term of search criteria may be maintained in an active state during a portion or substantially all of the time during which the data stream 12 is searched.

In FIG. 7, the data stream 12 presents the letter "i" to the recognition module 22. In response, each of the feature cells 63, 64, and 66 may output a signal on their output conductor 56, indicating the value stored in the memory cell 58 connected to the conductor 72, which represents the letter "i". The detection cells 68 may then each determine whether they have received a signal indicating a match and whether they are active. Because the feature cell 64 is configured to detect the letter "i" and is active, as indicated by its memory cell 70, the detection cell 68 in the feature cell 64 may output a signal to the activation-routing matrix 36 indicating that the next search term of its search criterion has been matched.

Next, the activation-routing matrix 36 may activate the feature cell 66, as illustrated by FIG. 8. Before evaluating the next term, the feature cell 64 may be deactivated. The feature cell 64 may be deactivated by its detection cell 68 resetting its memory cell 70 between detection cycles or the activation-routing matrix 36 may deactivate the feature cell 64, for example.

In FIG. 8, the data stream 12 presents the term "g" to the row decoder 28, which selects the conductor 74 representing the term "g". In response, each of the feature cells 63, 64, and 66 may output a signal on their output conductor 56, indicating the value stored in the memory cell 58 connected to the conductor 74, which represents the letter "g". The detection cells 68 may then each determine whether they have received a signal indicating a match and whether they are active. Because the feature cell 66 is configured to detect the letter "g" and is active, as indicated by its memory cell 70, the detection cell 68 in the feature cell 66 may output a signal to the activation-routing matrix 36 indicating that the last search term of its search criterion has been matched.

The end of a search criterion or a portion of a search criterion may be identified by the activation-routing matrix 36 or the detection cell 68. These components 36 or 68 may include memory indicating whether their feature cell 63, 64, or 66 specifies the last search term of a search criterion or a component of a search criterion. For example, a search criterion may specify all sentences in which the word "cattle" occurs twice, and the recognition module may output a signal indicating each occurrence of "cattle" within a sentence to the aggregation module, which may count the occurrences to determine whether the search criterion is satisfied.

Feature cells 63, 64, or 66 may be activated under several conditions. A feature cell 63, 64, or 66 may be "always active", meaning that it remains active during all or substantially all of a search. An example of an always active feature cell 63, 64, or 66 is the first feature cell of the search criterion, e.g., feature cell 63.

A feature cell 63, 64, or 66 may be "active when requested", meaning that the feature cell 63, 64, or 66 is active when some condition precedent is matched, e.g., when the preceding search terms in a search criterion are matched. An example is the feature cell 64, which is active when requested by the feature cell 63 in FIGS. 6-8, and the feature cell 66, which active when requested by the feature cell 64.

A feature cell 63, 64, or 66 may be "self activated", meaning that once it is activated, it activates itself as long as its search term is matched. For example, a self activated feature cell having a search term that is matched by any numerical digit may remain active through the sequence "123456xy" until the letter "x" is reached. Each time the search term of the self activated feature cell is matched, it may activate the next feature cell in the search criterion. Thus, an always active feature cell may be formed from a self activating feature cell and an active when requested feature cell: the self activating feature cell may be programmed with all of its memory cells 58 storing a 1, and it may repeatedly activate the active when requested feature cell after each term. In some embodiments, each feature cell 63, 64, and 66 may include a memory cell in its detection cell 68 or in the activation-routing matrix 36 that specifies whether the feature cell is always active, thereby forming an always active feature cell from a single feature cell.

Figure 9:
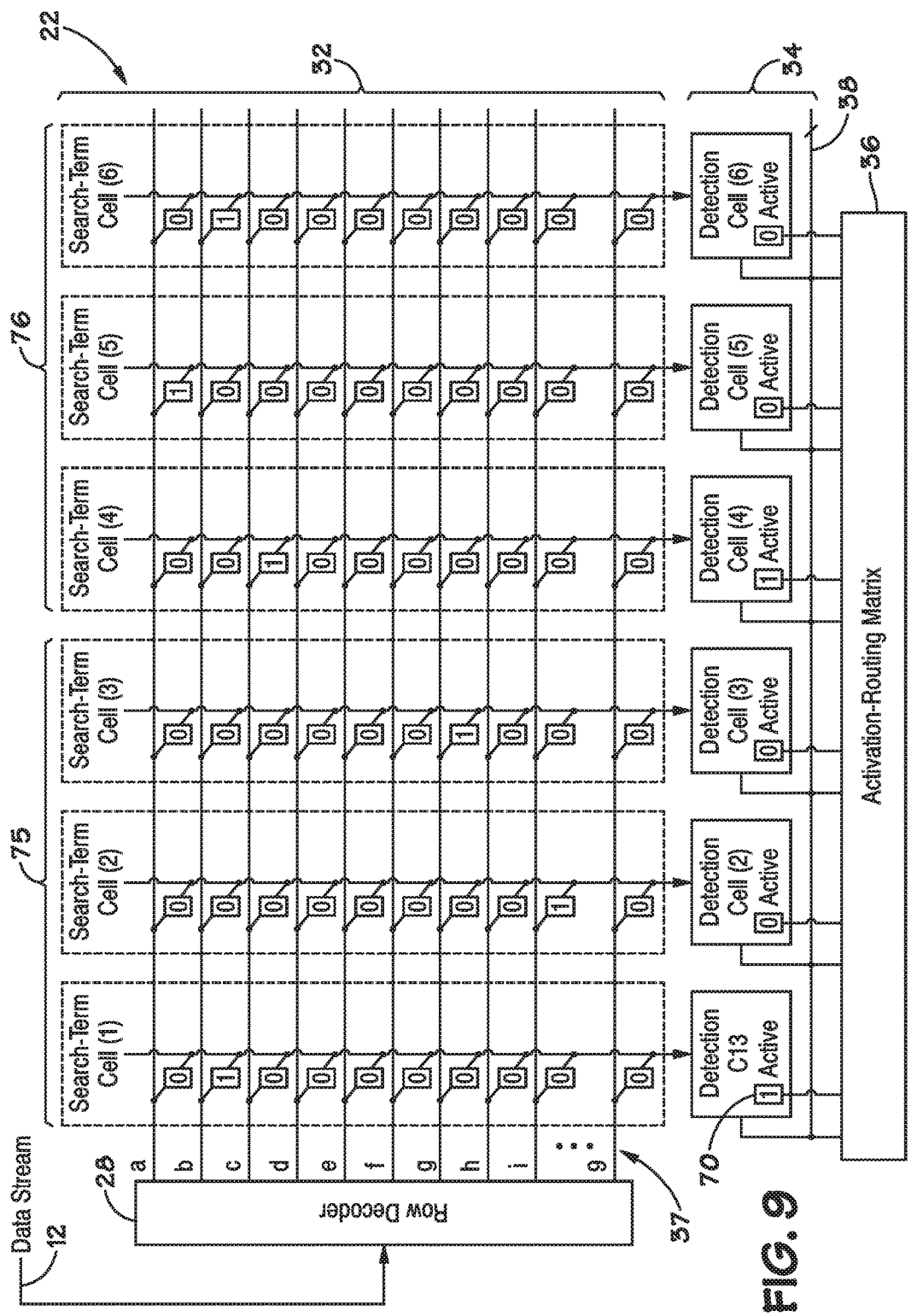
FIG. 9 depicts the recognition module configured to search the data stream for two words in parallel.

FIG. 9 depicts an example of a recognition module 22 configured to search according to a first search criterion 75 and a second search criterion 76 in parallel. In this example, the first search criterion 75 specifies the word "big", and the second search criterion 76 specifies the word "cab". A signal indicative of the current term from the data stream 12 may be communicated to feature cells in each search criterion 75 and 76 at generally the same time. Each of the input conductors 37 spans both of the search criteria 75 and 76. As a result, in some embodiments, both of the search criteria 75 and 76 may evaluate the current term generally simultaneously. This is believed to speed the evaluation of search criteria. Other embodiments may include more feature cells configured to evaluate more search criteria in parallel. For example, some embodiments may include more than 100, 500, 1000, 5000, or 10,000 feature cells operating in parallel. These feature cells may evaluate hundreds or thousands of search criteria generally simultaneously.

Search criteria with different numbers of search terms may be formed by allocating more or fewer feature cells to the search criteria. Simple search criteria may consume fewer resources in the form of feature cells than complex search criteria. This is believed to reduce the cost of the pattern-recognition processor 14 (FIG. 2) relative to processors with a large number of generally identical cores, all configured to evaluate complex search criteria.

Figure 10:
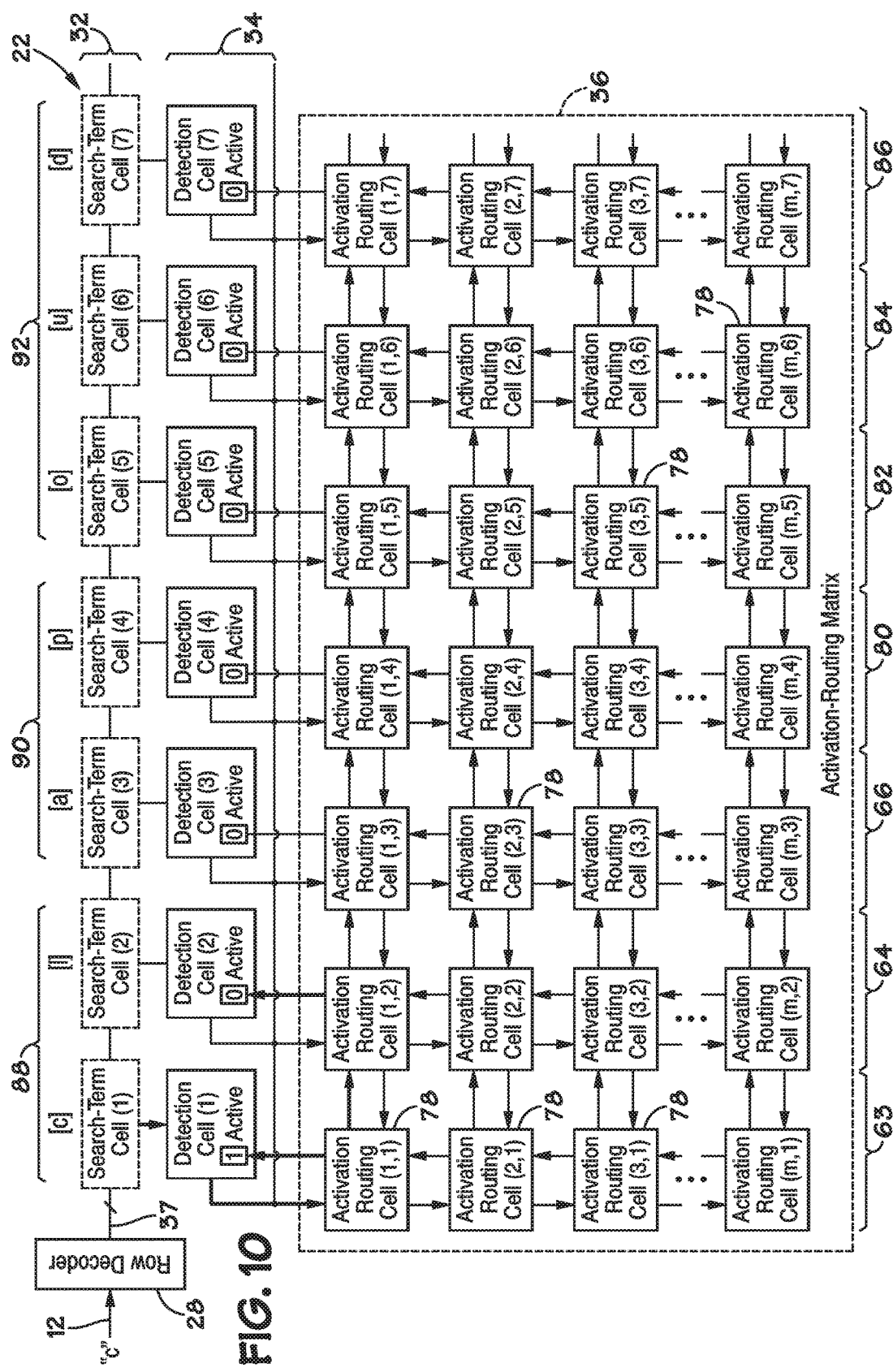
FIGS. 10-12 depict the recognition module searching according to a search criterion that specifies multiple words with the same prefix.
Figure 11:
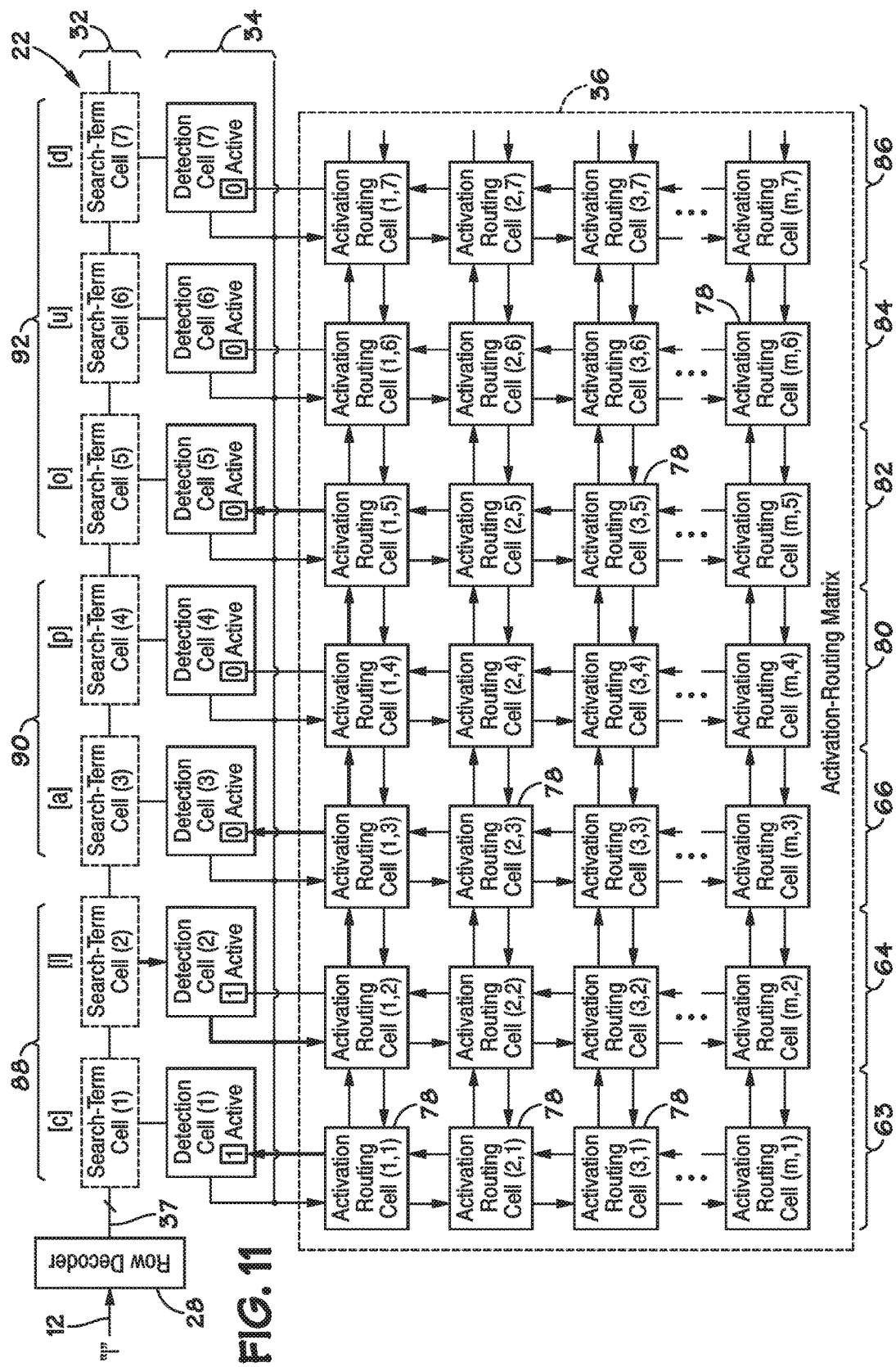
Figure 12:
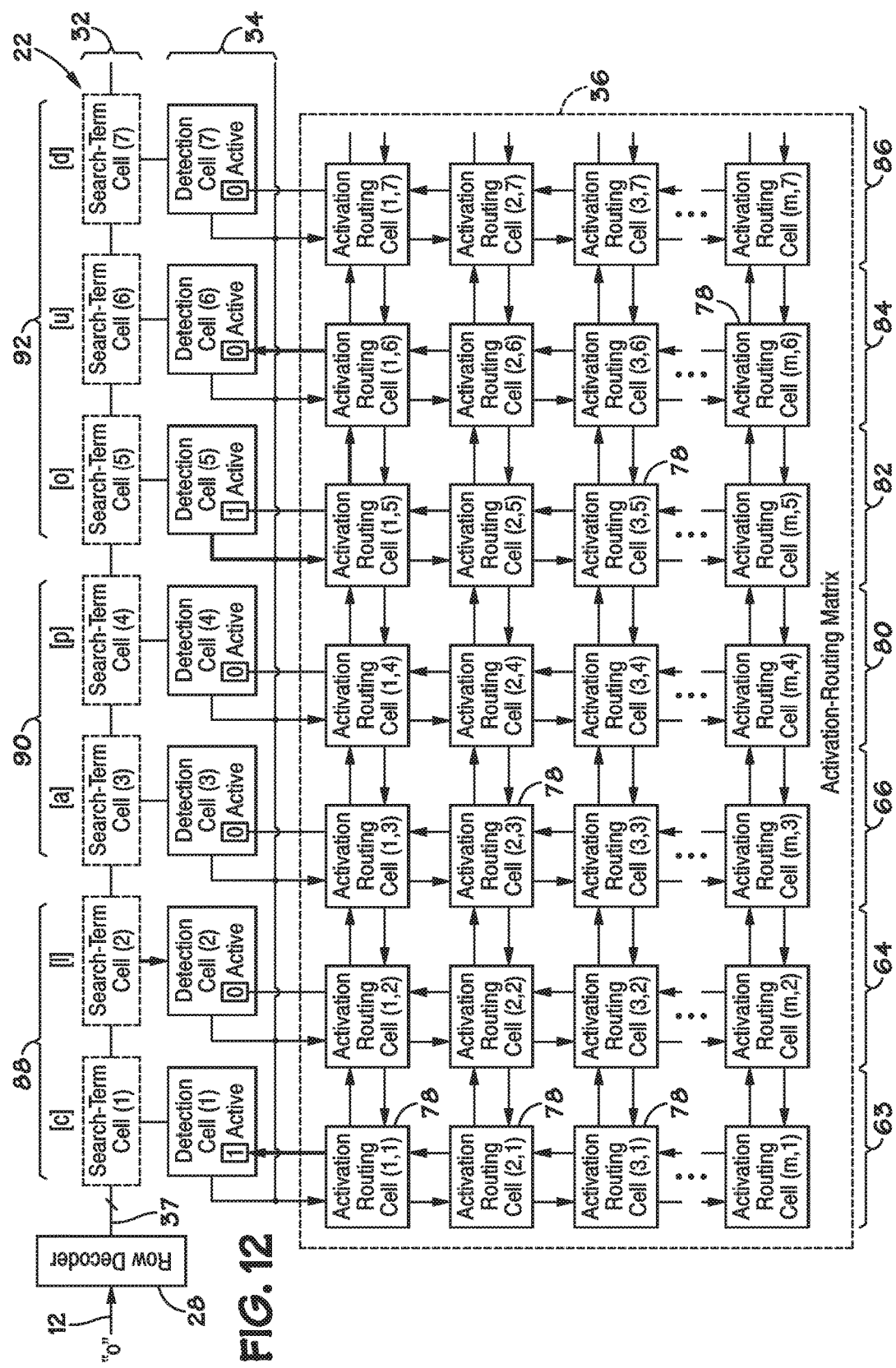

FIGS. 10-12 depict both an example of a more complex search criterion and features of the activation-routing matrix 36. The activation-routing matrix 36 may include a plurality of activation-routing cells 78, groups of which may be associated with each of the feature cells 63, 64, 66, 80, 82, 84, and 86. For instance, each of the feature cells may include 5, 10, 20, 50, or more activation-routing cells 78. The activation-routing cells 78 may be configured to transmit activation signals to the next search term in a search criterion when a preceding search term is matched. The activation-routing cells 78 may be configured to route activation signals to adjacent feature cells or other activation-routing cells 78 within the same feature cell. The activation-routing cells 78 may include memory that indicates which feature cells correspond to the next search term in a search criterion.

As illustrated by FIGS. 10-12, the recognition module 22 may be configured to search according to complex search criteria than criteria that specify single words. For instance, the recognition module 22 may be configured to search for words beginning with a prefix 88 and ending with one of two suffixes 90 or 92. The illustrated search criterion specifies words beginning with the letters "c" and "l" in sequence and ending with either the sequence of letters "ap" or the sequence of letters "oud". This is an example of a search criterion specifying multiple target expressions, e.g., the word "clap" or the word "cloud".

In FIG. 10, the data stream 12 presents the letter "c" to the recognition module 22, and feature cell 63 is both active and detects a match. In response, the activation-routing matrix 36 may activate the next feature cell 64. The activation-routing matrix 36 may also maintain the active state of the feature cell 63, as the feature cell 63 is the first search term in the search criterion.

In FIG. 11, the data stream 12 presents a letter "l", and the feature cell 64 recognizes a match and is active. In response, the activation-routing matrix 36 may transmit an activation signal both to the first feature cell 66 of the first suffix 90 and to the first feature cell 82 of the second suffix 92. In other examples, more suffixes may be activated, or multiple prefixes may active one or more suffixes.

Next, as illustrated by FIG. 12, the data stream 12 presents the letter "o" to the recognition module 22, and the feature cell 82 of the second suffix 92 detects a match and is active.

In response, the activation-routing matrix 36 may activate the next feature cell 84 of the second suffix 92. The search for the first suffix 90 may die out, as the feature cell 66 is allowed to go inactive. The steps illustrated by FIGS. 10-12 may continue through the letters "u" and "d", or the search may die out until the next time the prefix 88 is matched.

Figure 13:
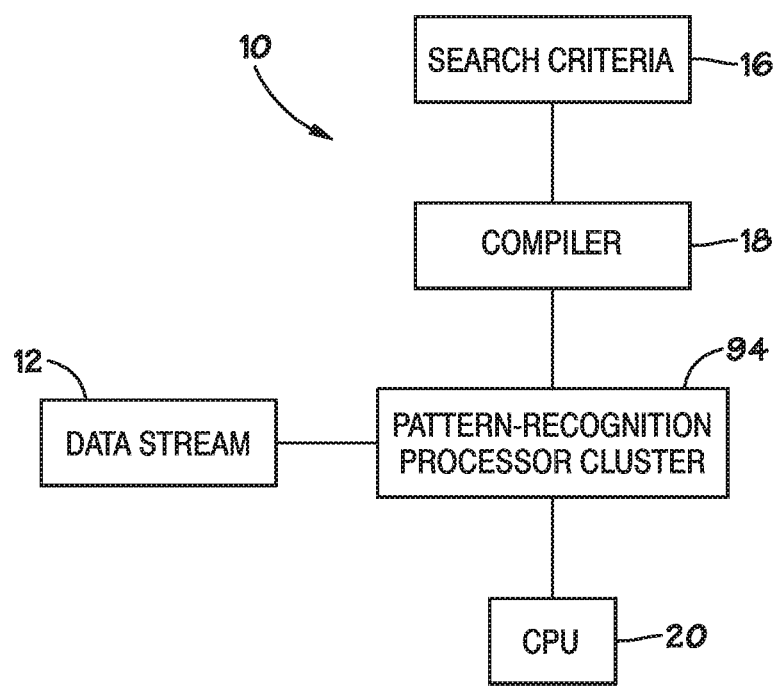
FIG. 13 depicts a second example of system that searches a data stream.

FIG. 13 depicts a second example of a system 10 that searches a data stream 12. The system 10 may include a search criteria 16, a compiler 18, and a CPU 20 that function as described above with respect to FIG. 1. As will be appreciated, while a CPU 20 is illustrated and described herein, the CPU 20 may, in some embodiments represent a processing unit, other than in the CPU. FIG. 13 also includes a pattern-recognition processor cluster 94 that may search the data stream 12 according to search criteria 16.

The pattern-recognition processor cluster 94 may be made up of a plurality of pattern-recognition processors 14. Accordingly, the pattern-recognition processor cluster 94 may search one or more target expressions. The pattern-recognition processor cluster 94 may utilize the pattern-recognition processors 14 collectively to search an individual target expression, or, alternatively, the pattern-recognition processor cluster 94 may utilize each pattern-recognition processor 14 to search an individual target expression.

Moreover, the pattern-recognition processor cluster 94 may be utilized in searching the data stream 12 based on a given search criterion. Each search criterion may specify one or more target expressions and each search criterion may be constructed from one or more search terms. Accordingly, the pattern-recognition processor cluster 94 may utilize the pattern-recognition processors 14 collectively to search each search criterion, or, alternatively, the pattern-recognition processor cluster 94 may utilize each pattern-recognition processor 14 to search a particular search criterion. In this manner, the system 10 may gain greater flexibility in its searching capability because the pattern-recognition processors 14 in the pattern-recognition processor cluster 94 may be flexible in their searching of the data stream 12. Part of the flexibility of the pattern-recognition processor cluster 94 may derive from the use of parallel direct memory access (PDMA) techniques that allow for a direct memory access (DMA) master to control the flow and timing of data to the DMA slaves, as well as the processing of the data in parallel.

Figure 14:
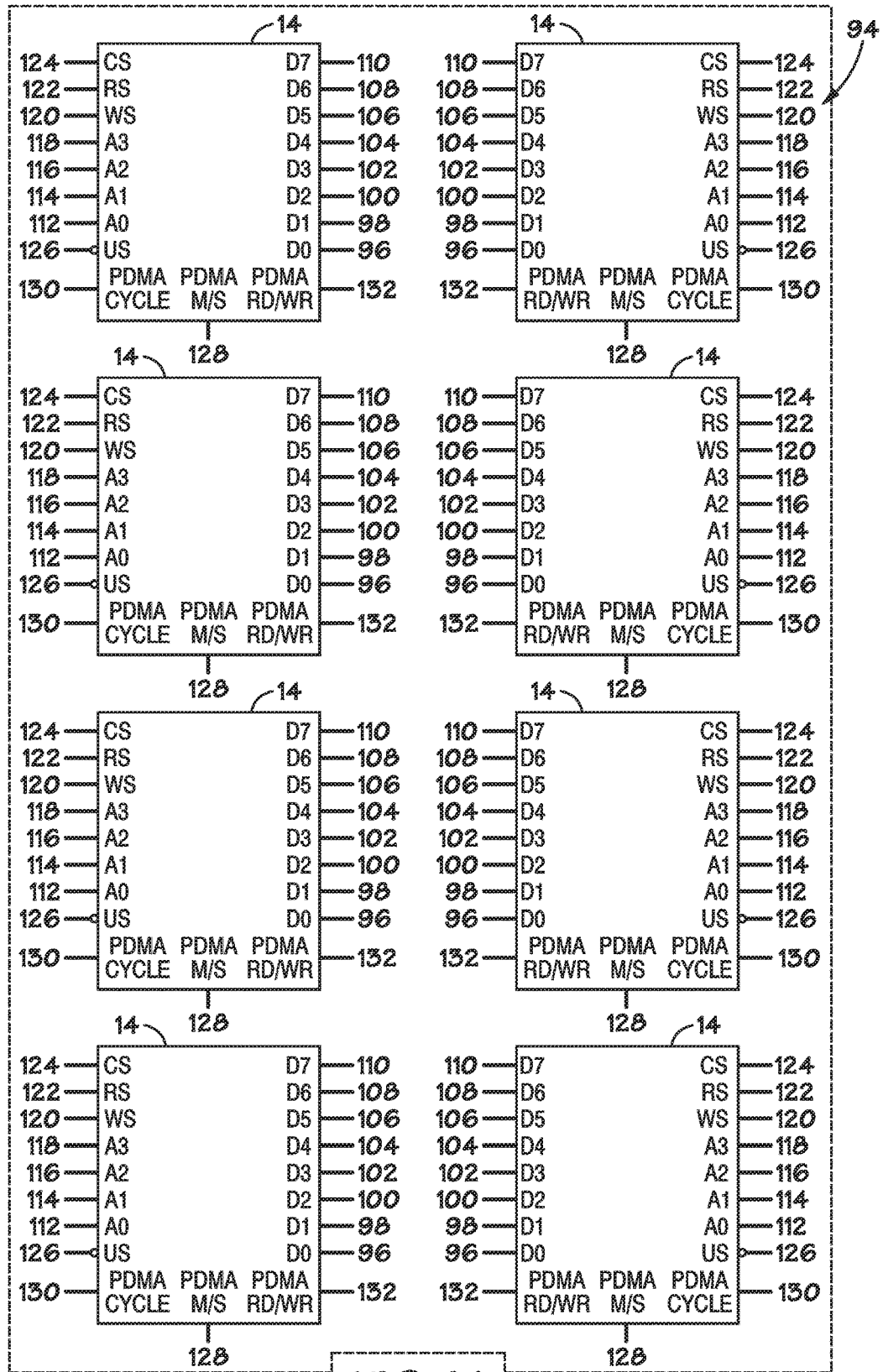
FIG. 14 depicts an example of a pattern-recognition processor cluster in the system of FIG. 13.

FIG. 14 illustrates a pattern-recognition processor cluster 94 that includes eight pattern-recognition processors 14 that may embody the parallel DMA processing discussed above. While eight pattern-recognition processors 14 are illustrated, it should be recognized that more or fewer than eight pattern-recognition processors 14 may be utilized in a given pattern-recognition processor cluster 94. Each pattern-recognition processor 14 is shown as a separately packaged integrated circuit. Alternatively, each of the pattern-recognition processors 14 may be integrated into one or more packages. Furthermore, while the total amount of pins for each pattern-recognition processor 14 may vary, the pattern-recognition processors 14 are illustrated with nineteen pins, in the present embodiment. The nineteen pins on each pattern-recognition processor 14 include eight data pins 96-110, four address pins 112-118, a write strobe pin 120, a read strobe pin 122, a chip select pin 124, a universal select pin 126, and three PDMA pins 128-132. The PDMA pins 128-132 include a PDMA M/S pin 128, a PDMA cycle pin 130, and a PDMA RD/WR pin 132.

The eight data pins 96-110 may be used to receive data from the data stream 12 for pattern-recognition processing. Likewise, the data pins 96-110 may be utilized in transmitting data upon completion of a pattern search by the one or more of the pattern-recognition processors 14 of the pattern-recognition processor cluster 94. Each of the pattern-recognition processors 14 also may include four address pins 112-118. These address pins 112-118 may be used to specify functions to be performed within a pattern-recognition processor 14. Alternatively, the address pins 112-118 may be utilized to select one or more feature cells 30 in the pattern-recognition processor 14. As such, the address pins 112-118 may collectively or singularly be utilized to control the operation of the pattern-recognition processors 14.

Each of the pattern-recognition processors 14 may also include a write strobe pin 120 and a read strobe pin 122. The write strobe pin 120 and the read strobe pin 122 may be utilized to set the pattern-recognition processor 14 to a write mode or a read mode, respectively. The pattern-recognition processors 14 may be placed into a write mode, for example, when the data stream 12 is being transmitted to the pattern-recognition processors 14 for processing. Thus, when the pattern-recognition processors 14 are to receive data along data lines 96-110, the write strobe pin 120 may be selected by, for example, transmitting a high signal to the write strobe pin 120.

The read strobe pin 122 may operate in a similar manner to the write strobe pin 120 described above. The read strobe pin 122 may be selected when the pattern-recognition processors 14 are to be placed into a read mode, for example, when the results of the pattern-recognition processing may be transmitted along data lines 96-110 to, for example, the CPU 20. To insure that the data lines 96-110 are operating in a read mode, the pattern-recognition processor 14 may allow for data, i.e. matching results, to be transmitted along the data lines 96-110 when the read strobe pin 122 is selected. Selection of the read strobe pin 122 may occur by transmitting a high signal to the read strobe pin 122. Thus, when the read strobe pin 122 is selected, the pattern-recognition processor 14 may be able to transmit data, for example, to the CPU 20 along data lines 96-110. In this manner, the pattern-recognition processors 14 may be able to receive data and transmit data along the same data lines 96-110 without conflict, since the pattern-recognition processors 14 may transmit receive data when the write strobe pin 120 is selected and read transmit data when the read strobe pin 122 is selected.

Each of the pattern-recognition processors 14 may further include a chip select pin 124. The chip select pin 124 may be used to activate a given pattern-recognition processor 14. By utilizing a chip select pin 124 on each pattern-recognition processor 14, any individual and/or a plurality of pattern-recognition processors 14 may be activated. This activation may allow the individual pattern-recognition processors 14 to be individually configured. Furthermore, the chip select pin 124 may be utilized to determine the status of any specific pattern-recognition processor 14. In this manner, a minimum number of pattern-recognition processors 14 may be activated at any given time, as determined by the requirements of a given pattern search.

Each of the pattern-recognition processors 14 may also include a universal select pin 126. The universal select pin 126 may be utilized in a manner similar to the chip select pin 124 described above, however, the universal select pin 126 may be used to activate all the pattern-recognition processors 14 of a pattern-recognition processor cluster 94 in parallel. By activating all of the pattern-recognition processors 14 in parallel, synchronization of the processing between multiple pattern-recognition processors 14 may be achieved. For example, all of the pattern-recognition processors 14 may operate concurrently on the data stream 12. This may be accomplished by each of the pattern-recognition processors 14 receiving an activation signal at the universal select pin 126, allowing the pattern-recognition processors 14 to be activated simultaneously so that the pattern-recognition processors 14 may process the data received across the respective data pins 96-110.

Each of the pattern-recognition processors 14 may further include a PDMA M/S pin 128. The setting of the PDMA M/S pins 128 may determine if a pattern-recognition processor 14 will be placed into a DMA master or DMA slave device mode. A DMA master device may interface with the CPU 20 to request control of the data bus that provides the data stream. The CPU 20 may program the DMA master device with information relating to the size and location of a data stream 12 to be processed, and subsequently yield control of the data bus, used to provide the data stream. Upon completion of the processing, the DMA master may notify the CPU 20 that the search is complete and yield control back to the CPU 20. In this manner, a single pattern-recognition processor 14 may control the parallel data stream processing of the system 10 by acting as a DMA master device and transmitting a DMA cycle to all the DMA slave devices so that the data stream 12 may be simultaneously processed by the DMA master and DMA slave devices, whereby the DMA cycle may correspond to one or more single search cycles and a single search cycle may correspond to the time allotted to the pattern-recognition processors 14 for processing one unit of data in the data stream 12, such as, a single byte of data or a plurality of bytes of data. Alternatively, a system DMA device could be utilized as the DMA master, whereby the pattern-recognition processors 14 may each be DMA slave devices. Thus, regardless of the location of the DMA master device, utilization of a DMA master device may free the CPU 20 to perform other system tasks.

In one embodiment, a high signal on the PDMA M/S pin 128 is utilized to set a pattern-recognition processor 14 as the DMA master device, while a low signal on the remaining PDMA M/S pins 128 set the remaining pattern-recognition processors 14 to DMA slave devices. Alternatively, firmware or a computer program stored on a tangible machine readable medium, such as a memory device in the system 10, may be utilized to configure a pattern-recognition processor 14 as the DMA master device, as well as to configure the remaining pattern-recognition processors 14 of the pattern-recognition cluster 94 as DMA slave devices.

Each of the pattern-recognition processors 14 may also include a PDMA cycle pin 130 and a PDMA RD/WR pin 132. The PDMA cycle pin 130 may be utilized to control the movement of data from the data stream 12 into and out of the pattern-recognition processors 14. Furthermore, the DMA master device may utilize the PDMA cycle pins 130 of the DMA slave devices to control the DMA cycles for the pattern-recognition processors 14 so that the pattern-recognition processors 14 may operate on the same data concurrently. Furthermore, the PDMA RD/WR pin 132 for each of the pattern-recognition processors 14 may be utilized to set the pattern-recognition processors 14 to either a parallel read or a parallel write function. A parallel write function may include the pattern-recognition processors 14 receiving data for processing data concurrently. A parallel read function may include the pattern-recognition processors 14 transmitting processed data concurrently. Thus, the DMA master device may control the parallel read and write functions of the pattern-recognition processors 14 of the pattern-recognition processor cluster 94 via the PDMA RD/WR pins 132.

Figure 15A:
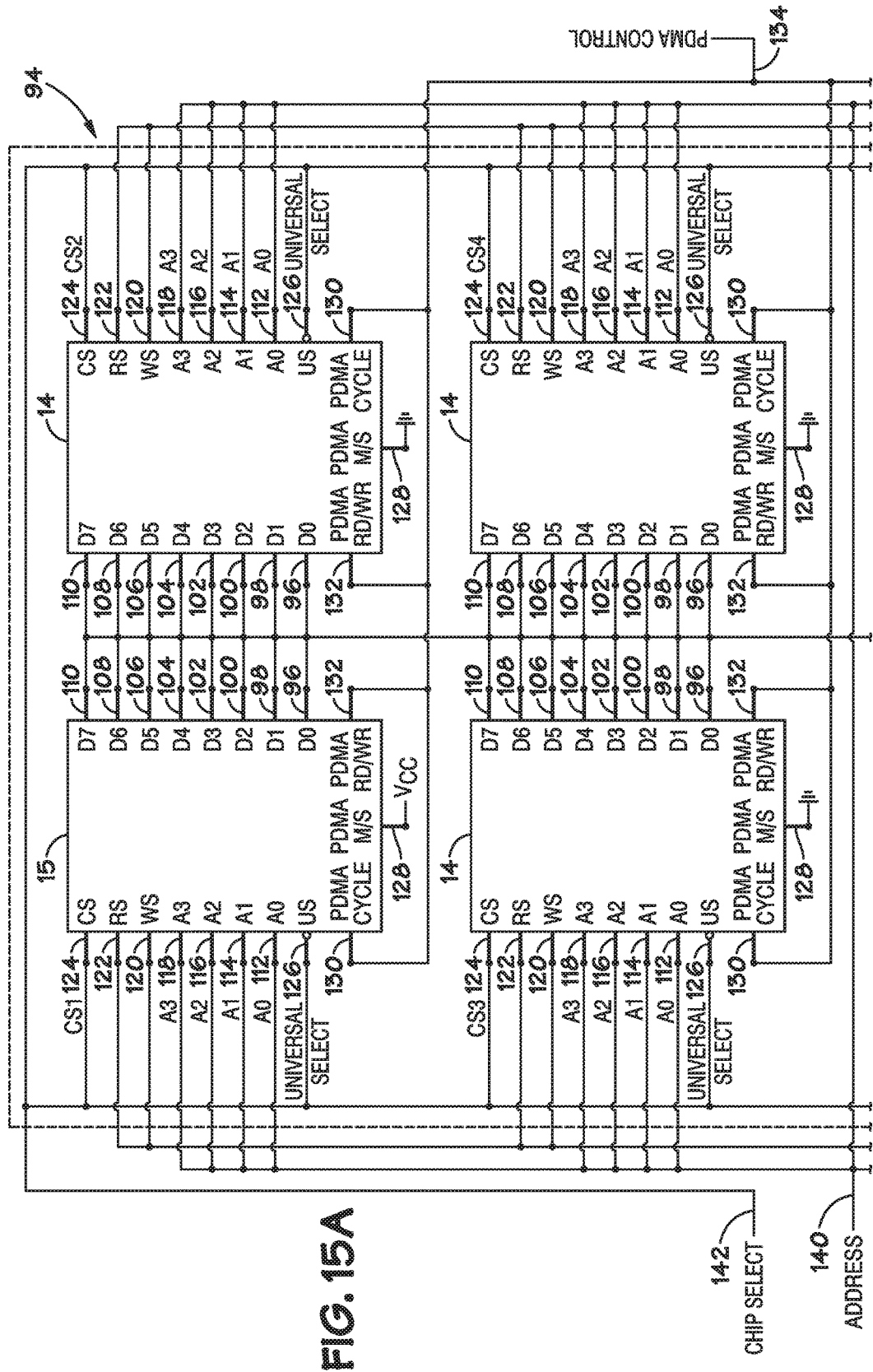

FIGS. 15A-15B depict a detailed example of control circuitry and input busses used in conjunction with the pattern-recognition processor cluster 94 of FIG. 14. The input busses may include a PDMA control bus 134, data bus 136, a command bus 138, an address bus 140, and a chip select bus 142. These busses 134-142 may be utilized to perform simultaneous parallel processing of a data steam 12.

The PDMA control bus 134 may allow for communication between the CPU 20 and a pattern-recognition processor set as a DMA master device 15. In this manner, the DMA master device 15 may receive from the CPU 20, information relating to the size and location of a data stream 12 to be processed by the pattern-recognition processor cluster 94. The DMA master device 15 may then control the DMA slave devices, which may include the remaining pattern-recognition processors 14 of the pattern-recognition processor cluster 94, by transmitting PDMA control signals to the DMA slave devices to allow each processor 14 in the cluster 94 to process the data stream 12 during the same DMA cycle, i.e. for each processor 14 in the cluster 94 to concurrently respond to DMA bus cycles. Thus, the PDMA control signals become output signals of the DMA master device 15 and input signals to the DMA slave devices.

The PDMA control bus 134 may be utilized to transmit the DMA control signals from the DMA master device 15 to the DMA slave devices, i.e. the pattern-recognition processors 14. These PDMA control signals may include a PDMA cycle signal that may be utilized to control the movement of data from the data stream 12 into and out of the pattern-recognition processors 14. The PDMA cycle signal may be generated based on a DMA cycle signal received by the DMA master 15 from the CPU 20. The PDMA cycle signal may be driven from the DMA master device 15 and received by the slave devices as, for example, a parallel enable signal that allows the DMA master and DMA slave devices to perform an operation on concurrently received data.

The PDMA control bus 134 may also be utilized to transmit PDMA RD/WR signals from the DMA master device 15 to the DMA slave devices. The PDMA RD/WR signals may be utilized to set the DMA slave devices, i.e. the pattern-recognition processors 14, to either a parallel read or a parallel write function. A parallel write function may include the DMA slave devices receiving data for processing data concurrently while a parallel read function may include the DMA slave devices transmitting processed data concurrently. Thus, the DMA master device 15 may control the parallel read and write functions of the pattern-recognition processors 14 of the pattern-recognition processor cluster 94 via the PDMA control bus 134.

A second bus used in conjunction with the pattern-recognition processor cluster 94 is the data bus 136. The data bus 136 may include a plurality of bi-directional data lines that may be connected to the data pins 96-110 of each of the pattern-recognition processors 14 and the DMA master device 15 in the pattern-recognition processor cluster 94. The data bus 136 may also receive a data stream 12 and may be utilized to transmit search results to the CPU 20.

An additional input bus may be a command bus 138. The command bus 138 may be utilized to deliver command signals to the pattern-recognition processors 14 and/or the DMA master device 15 in the pattern-recognition processor cluster 94. These command signals may be transmitted to the write strobe pin 120 and/or the read strobe pin 122 of one or more of the pattern-recognition processors 14 and/or the DMA master device 15. Accordingly, the command signals may be utilized to place one of the pattern-recognition processors 14 or the DMA master device 15 into an operational mode. For example, the command signals may place a single pattern-recognition processor 14 into a read mode or a write mode.

An address bus 140 may also be utilized in the operation of the pattern-recognition processor cluster 94. The address bus 140 may be utilized to transmit signals to the address pins 112-118 for specifying functions within the pattern-recognition processors 14 and/or the DMA master device 15. Similarly, the address bus 140 may be utilized to transmit signals to the address pins 112-118 for specifying and/or activating certain registers within the pattern-recognition processors 14 and/or the DMA master device 15.

Additionally, the chip select bus 142 may be utilized to transmit selection signals to control circuitry for determining which of the pattern-recognition processors 14 and/or the DMA master device 15 are to be activated. The selection signals may determine if all of the pattern-recognition processors 14 and the DMA master device 15 are to be activated concurrently via each universal select pin 126, or, for example, whether a specific pattern-recognition processor 14 is to be activated for processing of the data stream 12.

By allowing one of the pattern-recognition processors 14 to become a DMA master device 15, the CPU 20 of the main system may be freed to perform other tasks as a data stream 12 is processed. Accordingly, the DMA master device may control the parallel operation, i.e. data reading, data processing, and data writing characteristics, of the pattern-recognition processor cluster 94, as well as notify the CPU 20 of the completion of any parallel operations. In this manner, the pattern-recognition processor cluster 94 may process a data stream 12 concurrently, i.e. during the same parallel DMA cycle, while the CPU 20 is free to perform tasks separate from the processing of the data stream 12.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. An electronic device, comprising:
a plurality of pattern-recognition processors, wherein each pattern-recognition processor of the plurality of pattern-recognition processors comprises a plurality of programmable elements, wherein each programmable element of the plurality of programmable elements comprises a plurality of memory cells configured to be selectively utilized in an analysis of data;
a control bus coupled to each pattern-recognition processor of the plurality of pattern-recognition processors, wherein the control bus is configured to transmit a control signal to a first pattern-recognition processor of the plurality of pattern-recognition processors to control movement of the data from a data stream into and out of the first pattern-recognition processor; and
a pattern-recognition cluster comprising the plurality of pattern-recognition processors and the control bus, wherein the pattern-recognition cluster is configured to request control of a data bus configured to provide the data stream from a CPU coupled to the pattern-recognition cluster.

2. The electronic device of claim 1, wherein the control bus is configured to transmit the control signal to a second pattern-recognition processor of the plurality of pattern-recognition processors to control movement of the data from the data stream into and out of the second pattern-recognition processor.

3. The electronic device of claim 2, wherein the control bus is configured to transmit the control signal to the first pattern-recognition processor and to the second pattern-recognition processor concurrently.

4. The electronic device of claim 3, wherein the first pattern-recognition processor and the second pattern-recognition processor operate concurrently on received data in response to the control signal.

5. The electronic device of claim 1, wherein the pattern-recognition cluster is configured to yield control of the data bus to the CPU.

6. The electronic device of claim 5, wherein the pattern-recognition cluster is configured to notify the CPU upon completion of the analysis of the data stream.

7. The electronic device of claim 6, wherein the pattern-recognition cluster is configured to yield control of the data bus to the CPU upon completion of the analysis of the data stream.

8. A system, comprising:
a processing unit adapted to generate information related to processing of a data stream; and
a pattern-recognition cluster comprising:
a plurality of pattern-recognition processors, wherein each pattern-recognition processor of the plurality of pattern-recognition processors comprises a plurality of programmable elements, wherein each programmable element of the plurality of programmable elements comprises a plurality of memory cells configured to be selectively utilized in an analysis of data;
a control bus coupled to each pattern-recognition processor of the plurality of pattern-recognition processors, wherein the control bus is configured to transmit a control signal to a first pattern-recognition processor of the plurality of pattern-recognition processors to control movement of data from the data stream into and out of the first pattern-recognition processor; and
a data bus configured to provide the data stream to the pattern-recognition cluster, wherein the pattern-recognition cluster is configured to request control of the data bus from the processing unit.

9. The system of claim 8, wherein the control bus is configured to transmit the control signal to a second pattern-recognition processor of the plurality of pattern-recognition processors to control movement of data from the data stream into and out of the second pattern-recognition processor.

10. The system of claim 9, wherein the control bus is configured to transmit the control signal to the first pattern-recognition processor and to the second pattern-recognition processor currently.

11. The system of claim 10, wherein the first pattern-recognition processor and the second pattern-recognition processor operate concurrently on received data in response to the control signal.

12. The system of claim 8, wherein the pattern-recognition cluster is configured to yield control of the data bus to the processing unit upon completion of the analysis of the data stream.

* * * * *